United States Patent
Song et al.

(10) Patent No.: US 10,608,423 B2
(45) Date of Patent: *Mar. 31, 2020

(54) ELECTRIC VEHICLE INVERTER MODULE LAMINATED BUS BAR

(71) Applicant: SF Motors, Inc., Santa Clara, CA (US)

(72) Inventors: Yunan Song, Santa Clara, CA (US); Kangwei Mao, Santa Clara, CA (US); Jinzhu Li, Santa Clara, CA (US); Colin Haag, Santa Clara, CA (US); Nathan Chung, Santa Clara, CA (US); Zhong Nie, Santa Clara, CA (US); Duanyang Wang, Santa Clara, CA (US); Yifan Tang, Santa Clara, CA (US)

(73) Assignees: SF MOTORS, INC., Santa Clara, CA (US); CHONGQING JINKANG NEW ENERGY VEHICLE CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,513

(22) Filed: Aug. 23, 2018

(65) Prior Publication Data

US 2019/0334334 A1    Oct. 31, 2019

Related U.S. Application Data

(60) Provisional application No. 62/663,210, filed on Apr. 26, 2018.

(51) Int. Cl.
*H02G 5/00* (2006.01)
*H02M 7/00* (2006.01)
*B60L 50/50* (2019.01)

(52) U.S. Cl.
CPC .............. *H02G 5/005* (2013.01); *B60L 50/50* (2019.02); *H02M 7/003* (2013.01); *B60L 2210/40* (2013.01)

(58) Field of Classification Search
CPC ............ H02G 3/08; H02G 3/081; H02G 5/00; H02G 5/005; H05K 5/00; H05K 5/02;
(Continued)

(56) References Cited

U.S. PATENT DOCUMENTS 4,382,156 A * 5/1983 Jodoin .................. H02G 5/005
174/72 B
4,502,107 A    2/1985 Nilssen
(Continued)

FOREIGN PATENT DOCUMENTS

CN    203850295       9/2014
CN    204442853 U    7/2015
(Continued)

OTHER PUBLICATIONS

International Search Report and Written Opinion for International Appl. No. PCT/CN2018/125644, dated Apr. 2, 2019.
(Continued)

*Primary Examiner* — Angel R Estrada
(74) *Attorney, Agent, or Firm* — Foley & Lardner LLP; James De Vellis

(57) ABSTRACT

A laminated bus bar of an inverter module to power an electric vehicle is provided. The laminated bus bar can include a first insulating layer and a current layer disposed over the first insulting layer. The current layer can include an output terminal. The laminated bus bar can include a second insulating layer disposed over the current layer. The laminated bus bar can include a third insulating layer disposed over the second insulating layer. The laminated bus bar can include a first polarity (e.g., negative) layer disposed over the third insulating layer. The first polarity layer can include a first polarity (e.g., negative) input terminal. The laminated bus bar can include a fourth insulating layer disposed over the first polarity layer. The laminated bus bar can include a
(Continued)

second polarity (e.g., positive) layer disposed over the fourth insulating layer and that includes a second polarity (e.g., positive) input terminal.

20 Claims, 6 Drawing Sheets

(58) Field of Classification Search
CPC .. H05K 5/0069; H05K 7/1432; H05K 7/1427; H05K 7/20845; H05K 7/00; H01B 1/026; H01B 1/00; B60L 2210/00; H02M 7/003; H02M 7/00
USPC .......... 174/50, 520, 71 B, 68.2, 88 B, 70 B, 174/99 B, 541, 528; 439/76.1, 76.2, 212; 361/611, 600, 601, 624, 637, 648, 679.01, 361/775
See application file for complete search history.

(56) References Cited

U.S. PATENT DOCUMENTS

| | | | |
|---|---|---|---|
| 4,584,768 A * | 4/1986 | Tosti | H02G 5/005 174/72 B |
| 5,365,424 A * | 11/1994 | Deam | H01L 23/52 174/72 B |
| 5,371,043 A | 12/1994 | Anderson et al. | |
| 5,514,906 A | 5/1996 | Love et al. | |
| 5,783,877 A | 7/1998 | Chitayat | |
| 5,804,761 A * | 9/1998 | Donegan | H02G 5/10 174/15.1 |
| 6,176,299 B1 | 1/2001 | Hanzlik et al. | |
| 6,822,850 B2 * | 11/2004 | Pfeifer | F28F 3/12 174/72 B |
| 6,843,335 B2 | 1/2005 | Shirakawa et al. | |
| 7,012,810 B2 | 3/2006 | Parkhill et al. | |
| 7,046,535 B2 | 5/2006 | Rodriguez et al. | |
| 7,113,405 B2 | 9/2006 | Armstrong et al. | |
| 7,292,451 B2 | 11/2007 | Rodriguez et al. | |
| 7,505,294 B2 | 3/2009 | Ahmed et al. | |
| 7,551,439 B2 | 6/2009 | Peugh et al. | |
| 7,557,298 B2 * | 7/2009 | Vanhoutte | H02G 5/005 174/149 B |
| 7,714,230 B2 * | 5/2010 | Beulque | H02G 5/005 174/117 A |
| 7,742,303 B2 | 6/2010 | Azuma et al. | |
| 7,742,307 B2 | 6/2010 | Ellsworth et al. | |
| 7,777,433 B2 | 8/2010 | Yamaguchi et al. | |
| 7,965,510 B2 | 6/2011 | Suzuki et al. | |
| 7,969,735 B2 | 6/2011 | Nakatsu et al. | |
| 8,059,404 B2 | 11/2011 | Miller et al. | |
| 8,391,008 B2 | 3/2013 | Dede | |
| 8,519,561 B2 | 8/2013 | Azuma et al. | |
| 8,773,007 B2 | 7/2014 | Van De Ven et al. | |
| 8,780,557 B2 | 7/2014 | Duppong et al. | |
| 8,888,506 B2 | 11/2014 | Nishimura et al. | |
| 8,947,899 B2 * | 2/2015 | Savatski | H02M 5/4585 174/68.2 |
| 8,952,525 B2 | 2/2015 | Ide et al. | |
| 9,007,767 B2 | 4/2015 | Nakajima | |
| 9,439,332 B2 | 9/2016 | Ide et al. | |
| 9,578,788 B2 | 2/2017 | Tang et al. | |
| 9,647,361 B2 | 5/2017 | Kobuchi et al. | |
| 10,122,294 B2 | 11/2018 | Xu et al. | |
| 10,215,504 B2 | 2/2019 | Coteus et al. | |
| 10,236,786 B2 | 3/2019 | Liu et al. | |
| 10,236,791 B1 | 3/2019 | Chung et al. | |
| 10,263,407 B1 * | 4/2019 | Song | H02G 5/005 |
| 2003/0111714 A1 | 6/2003 | Bates et al. | |
| 2003/0133257 A1 | 7/2003 | Beihoff et al. | |
| 2003/0218057 A1 | 11/2003 | Joseph et al. | |
| 2004/0060692 A1 | 4/2004 | Pfeifer et al. | |
| 2004/0227231 A1 | 11/2004 | Maly et al. | |
| 2004/0228094 A1 | 11/2004 | Ahmed et al. | |
| 2006/0092611 A1 | 5/2006 | Beihoff et al. | |
| 2006/0274561 A1 | 12/2006 | Ahmed et al. | |
| 2006/0291165 A1 | 12/2006 | Flesch et al. | |
| 2007/0236883 A1 | 10/2007 | Ruiz | |
| 2007/0246351 A1 | 10/2007 | Smola et al. | |
| 2007/0252169 A1 | 11/2007 | Tokuyama et al. | |
| 2008/0247139 A1 | 10/2008 | Stahlhut et al. | |
| 2008/0316710 A1 | 12/2008 | Seto et al. | |
| 2009/0129011 A1 | 5/2009 | Balzano | |
| 2010/0025126 A1 | 2/2010 | Nakatsu et al. | |
| 2010/0026090 A1 | 2/2010 | Nakatsu et al. | |
| 2010/0277868 A1 | 11/2010 | Beaupre et al. | |
| 2012/0325447 A1 | 12/2012 | You et al. | |
| 2013/0114210 A1 | 5/2013 | Ebersberger et al. | |
| 2013/0146253 A1 | 6/2013 | Daly | |
| 2013/0146254 A1 | 6/2013 | Jeon et al. | |
| 2013/0235527 A1 | 9/2013 | Wagner et al. | |
| 2014/0133150 A1 | 5/2014 | Pardikes et al. | |
| 2014/0262177 A1 | 9/2014 | Tang et al. | |
| 2014/0307389 A1 | 10/2014 | Arvelo et al. | |
| 2014/0345492 A1 | 11/2014 | Fujito et al. | |
| 2014/0347817 A1 | 11/2014 | Joshi et al. | |
| 2014/0369099 A1 | 12/2014 | Asako | |
| 2015/0003019 A1 | 1/2015 | Ide et al. | |
| 2015/0021756 A1 | 1/2015 | Adachi | |
| 2015/0289391 A1 | 10/2015 | Nakatsu et al. | |
| 2016/0155572 A1 | 6/2016 | Ramm et al. | |
| 2016/0156278 A1 | 6/2016 | Ramm et al. | |
| 2016/0183409 A1 | 6/2016 | Zhou et al. | |
| 2016/0242312 A1 | 8/2016 | Singh et al. | |
| 2017/0028869 A1 | 2/2017 | Boddakayala et al. | |
| 2017/0330815 A1 | 11/2017 | Mische et al. | |
| 2018/0184538 A1 | 6/2018 | Bayerer | |
| 2018/0184543 A1 | 6/2018 | Ando et al. | |
| 2018/0198378 A1 | 7/2018 | Xu et al. | |
| 2018/0206359 A1 | 7/2018 | McPherson et al. | |
| 2018/0330895 A1 | 11/2018 | Nagayoshi et al. | |
| 2019/0335607 A1 | 10/2019 | Song et al. | |
| 2019/0335608 A1 | 10/2019 | Song et al. | |

FOREIGN PATENT DOCUMENTS

| | | |
|---|---|---|
| CN | 106656021 A | 5/2017 |
| CN | 106848118 A | 6/2017 |
| CN | 107769604 A | 3/2018 |

OTHER PUBLICATIONS

Non-Final Office Action on U.S. Appl. No. 16/051,182 dated Nov. 2, 2018.
Non-Final Office Action on U.S. Appl. No. 16/051,190 dated Mar. 13, 2019.
Non-Final Office Action on U.S. Appl. No. 16/051,193 dated Apr. 9, 2019.
Non-Final Office Action on U.S. Appl. No. 16/110,425 dated Apr. 11, 2019.
Non-Final Office Action on U.S. Appl. No. 16/110,475 dated Mar. 13, 2019.
Non-Final Office Action on U.S. Appl. No. 16/110,559 dated Feb. 25, 2019.
Non-Final Office Action on U.S. Appl. No. 16/232,981 dated Mar. 13, 2019.
Non-Final Office Action on U.S. Appl. No. 16/233,028 dated Apr. 9, 2019.
Non-Final Office Action on U.S. Appl. No. 16/233,826 dated Apr. 11, 2019.
Non-Final Office Action on U.S. Appl. No. 16/233,842 dated Mar. 13, 2019.
Non-Final Office Action on U.S. Appl. No. 16/234,242 dated Feb. 25, 2019.
Notice of Allowance on U.S. Appl. No. 16/051,176 dated May 22, 2019.
Notice of Allowance on U.S. Appl. No. 16/051,176 dated Jul. 31, 2019.
Notice of Allowance on U.S. Appl. No. 16/051,182 dated Jan. 3, 2019.

(56) References Cited

OTHER PUBLICATIONS

Notice of Allowance on U.S. Appl. No. 16/051,190 dated Jul. 1, 2019.
Notice of Allowance on U.S. Appl. No. 16/051,193 dated Jul. 3, 2019.
Notice of Allowance on U.S. Appl. No. 16/051,991 dated May 20, 2019.
Notice of Allowance on U.S. Appl. No. 16/051,991 dated Jun. 18, 2019.
Notice of Allowance on U.S. Appl. No. 16/110,425 dated Jul. 30, 2019.
Notice of Allowance on U.S. Appl. No. 16/233,028 dated Jul. 3, 2019.
Notice of Allowance on U.S. Appl. No. 16/233,826 dated Jul. 31, 2019.
Notice of Allowance on U.S. Appl. No. 16/234,238 dated Feb. 20, 2019.
International Search Report and Written Opinion for PCT/CN2019/079353 dated Jul. 1, 2019 (11 pages).
International Search Report and Written Opinion on PCT/CN2019/079350 dated Jul. 3, 2019 (11 pages).
International Search Report and Written Opinion on PCT/CN2019/079352 dated Jun. 8, 2019 (11 pages).
Notice of Allowance on U.S. Appl. No. 16/232,981 dated Aug. 13, 2019.
Notice of Allowance on U.S. Appl. No. 16/232,981 dated Dec. 17, 2019 (10 pages).
Final Office Action on U.S. Appl. No. 16/110,475 dated Sep. 17, 2019 (17 pages).
Notice of Allowance on U.S. Appl. No. 16/051,176 dated Sep. 18, 2019 (9 pages).
Notice of Allowance on U.S. Appl. No. 16/051,190 dated Nov. 26, 2019 (2 pages).
Notice of Allowance on U.S. Appl. No. 16/051,190 dated Nov. 7, 2019 (10 pages).
Notice of Allowance on U.S. Appl. No. 16/051,991 dated Sep. 18, 2019 (9 pages).
Notice of Allowance on U.S. Appl. No. 16/110,475 dated Nov. 22, 2019 (8 pages).
Notice of Allowance on U.S. Appl. No. 16/110,513 dated Oct. 17, 2019 (2 pages).
Notice of Allowance on U.S. Appl. No. 16/233,842 dated Nov. 20, 2019 (8 pages).
Notice of Allowance on U.S. Appl. No. 16/233,842 dated Sep. 18, 2019 (11 pages).
Notice of Allowance on U.S. Appl. No. 16/234,242 dated Oct. 24, 2019 (11 pages).

\* cited by examiner

ELECTRIC VEHICLE INVERTER MODULE LAMINATED BUS BAR

CROSS REFERENCE TO RELATED APPLICATION

The present application claims the benefit of priority under 35 U.S.C. § 119(e) to U.S. Provisional Application 62/663,210, filed on Apr. 26, 2018, titled "ELECTRIC VEHICLE INVERTER MODULE LAMINATED BUS BAR," which is incorporated herein by reference in its entirety.

BACKGROUND

Batteries can include electrochemical materials to supply electrical power to various electrical components connected thereto. Such batteries can provide electrical energy to various electrical systems.

SUMMARY

Systems and methods described herein relate to a multiple phase inverter module formed having three power modules (which can also be referred to herein as half-bridge modules, half-bridge inverter modules or sub-modules) arranged for example in a triplet configuration for electric vehicle drive systems. Each of the power modules can include at least one laminated bus bar providing input terminals and an output terminal for the respective power module. The inverter module can be coupled with a drive train unit of an electric vehicle and can provide three phase voltages to the drive train unit. For example, each of the power modules can generate a single phase voltage and thus, the three half-bridge modules arranged in a triplet configuration can provide three phase voltages.

At least one aspect is directed to a laminated bus bar of an inverter module to power an electric vehicle. The laminated bus bar can include a first insulating layer having a first surface and a second surface. The laminated bus bar can include a current layer having a first surface and a second surface. The current layer can be disposed over the first surface of the first insulting layer. The current layer can include an output terminal. The laminated bus bar can include a second insulating layer having a first surface and a second surface. The second insulating layer can be disposed over the first surface of the current layer. The laminated bus bar can include a third insulating layer having a first surface and a second surface. The third insulating layer can be disposed over the first surface of the second insulating layer. The laminated bus bar can include a first polarity layer having a first surface and a second surface. The first polarity layer can be disposed over the first surface of the third insulating layer. The first polarity layer can include a negative input terminal. The laminated bus bar can include a fourth insulating layer having a first surface and a second surface. The fourth insulating layer can be disposed over the first surface of the first polarity layer. The laminated bus bar can include a second polarity layer having a first surface and a second surface. The second polarity layer can be disposed over the first surface of the fourth insulating layer. The second polarity layer can include a second polarity input terminal.

At least one aspect is directed to a method of providing a laminated bus bar of an inverter module to power an electric vehicle. The method can include providing a first insulating layer having a first surface and a second surface. The method can include disposing a current layer having a first surface and a second surface over the first surface of the first insulting layer. The current layer can include an output terminal. The method can include disposing a second insulating layer having a first surface and a second surface over the first surface of the current layer. The method can include disposing a third insulating layer having a first surface and a second surface over the first surface of the second insulating layer. The method can include disposing a first polarity layer having a first surface and a second surface over the first surface of the third insulating layer. The first polarity layer can include a first polarity terminal. The method can include disposing a fourth insulating layer having a first surface and a second surface over the first surface of the first polarity layer. The method can include disposing a second polarity layer having a first surface and a second surface over the first surface of the fourth insulating layer, the second polarity layer including a second polarity terminal.

At least one aspect is directed to a method. The method can include providing a laminated bus bar of an inverter module to power an electric vehicle. The laminated bus bar can include a first insulating layer having a first surface and a second surface. The laminated bus bar can include a current layer having a first surface and a second surface. The current layer can be disposed over the first surface of the first insulting layer. The current layer can include an output terminal. The laminated bus bar can include a second insulating layer having a first surface and a second surface. The second insulating layer can be disposed over the first surface of the current layer. The laminated bus bar can include a third insulating layer having a first surface and a second surface. The third insulating layer can be disposed over the first surface of the second insulating layer. The laminated bus bar can include a first polarity layer having a first surface and a second surface. The first polarity layer can be disposed over the first surface of the third insulating layer. The first polarity layer can include a first polarity input terminal. The laminated bus bar can include a fourth insulating layer having a first surface and a second surface. The fourth insulating layer can be disposed over the first surface of the first polarity layer. The laminated bus bar can include a second polarity layer having a first surface and a second surface. The second polarity layer can be disposed over the first surface of the fourth insulating layer. The second polarity layer can include a second polarity input terminal.

At least one aspect is directed to an electric vehicle. The electric vehicle can include a laminated bus bar of an inverter module to power the electric vehicle. The laminated bus bar can include a first insulating layer having a first surface and a second surface. The laminated bus bar can include a current layer having a first surface and a second surface. The current layer can be disposed over the first surface of the first insulting layer. The current layer can include an output terminal. The laminated bus bar can include a second insulating layer having a first surface and a second surface. The second insulating layer can be disposed over the first surface of the current layer. The laminated bus bar can include a third insulating layer having a first surface and a second surface. The third insulating layer can be disposed over the first surface of the second insulating layer. The laminated bus bar can include a first polarity layer having a first surface and a second surface. The first polarity layer can be disposed over the first surface of the third insulating layer. The first polarity layer can include a first polarity input terminal. The laminated bus bar can include a fourth insulating layer having a first surface and a second surface. The fourth insulating layer can be disposed over the first surface of the first polarity layer. The laminated bus bar can include a second polarity layer having a first surface and a second surface. The second polarity layer can be disposed over the first surface of the fourth insulating layer. The second polarity layer can include a second polarity input terminal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of laminated bus bars for battery packs in electric vehicles. The various concepts introduced above and discussed in greater detail below can be implemented in any of numerous ways.

Systems and methods described herein relate to a bus bar of an inverter module of a drive train unit of an electric vehicle. The bus bar can be a laminated bus bar that includes a plurality of layers. The drive train unit of an electric vehicle can include one or more inverter modules. For example, the drive train unit can include a multiple phase inverter module formed having three power modules (which can also be referred to herein as half-bridge modules, half-bridge inverter modules or sub-modules) arranged for example in a triplet configuration for electric vehicle drive systems. The power modules can include at least one laminated bus bar. The laminated bus bar can include a first polarity (e.g., negative) input, a second polarity (e.g., positive) input, and an output terminal. The second polarity input terminal of the laminated bus bar can correspond to the second polarity input of the respective power module. The first polarity (e.g., negative) input terminal of the laminated bus bar can correspond to the first polarity (e.g., negative) input of the respective power module. The output terminal of the laminated bus bar can correspond to the second polarity (e.g., positive) input of the respective power module. The power modules can be coupled together with their respective second polarity (e.g., positive) input terminals aligned, first polarity (e.g. negative) input terminals aligned, and output terminals aligned to provide a compact design for the multiple phase inverter module. The multiple phase inverter module can couple with a drive train unit of an electric vehicle and be configured to provide three phase voltages to the drive train unit. For example, each of the power modules can generate a single phase voltage and thus, the three inverter modules arranged in a triplet configuration can provide three phase voltages. In some examples presented herein, and for ease of description, negative polarity can be considered a first polarity, and positive polarity can be considered a second polarity. However these polarities are examples and can be reversed for the bus bar 110 and other inverter module 450 or other components described herein so that negative polarity can be considered the second polarity and positive polarity can be considered the first polarity.

Figure 1:
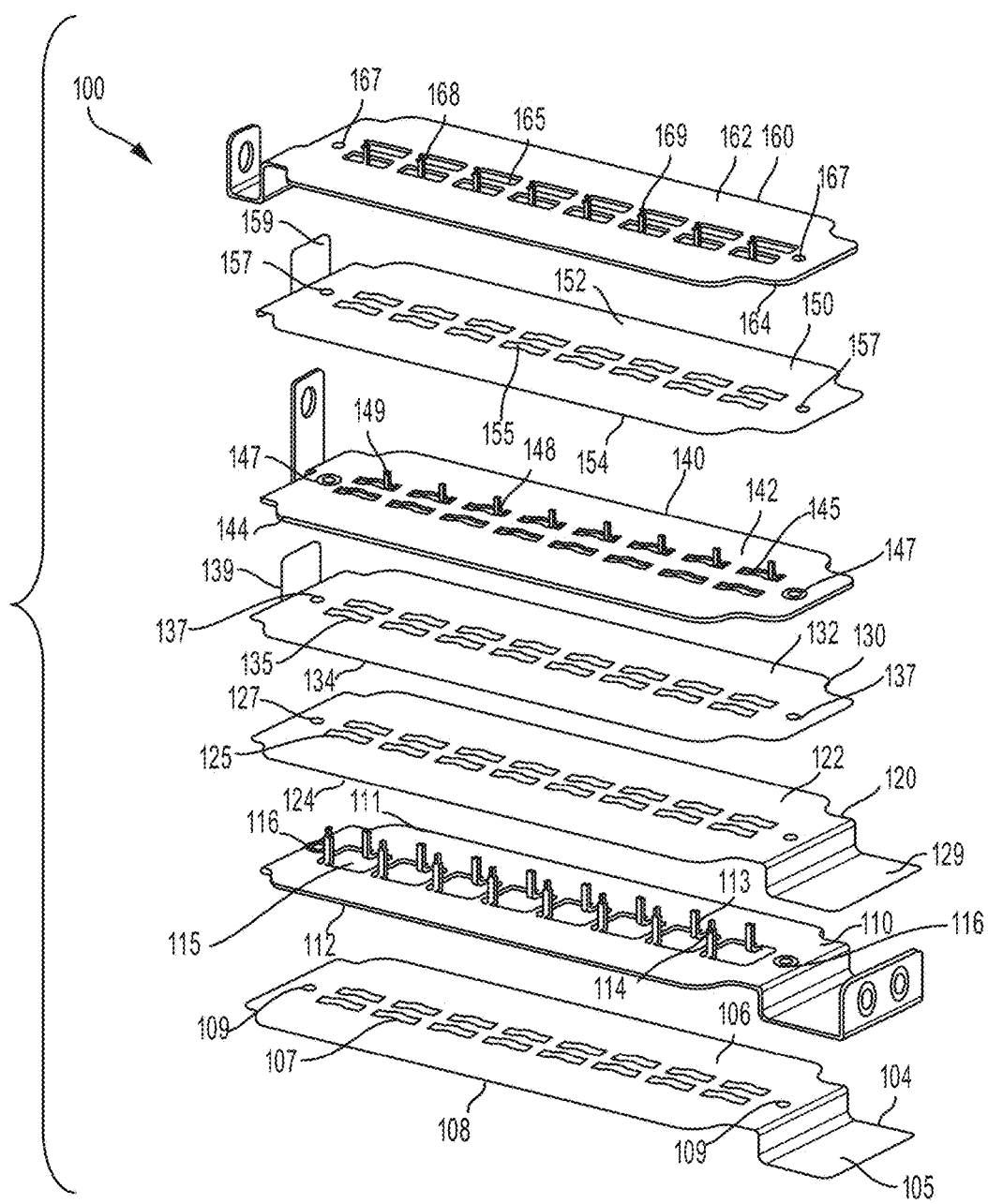
FIG. 1 depicts an example exploded view of a laminated bus bar of an inverter module of a drive unit of an electric vehicle; according to an illustrative implementation.

FIG. 1, among others, depicts an exploded view of a laminated bus bar 100 illustrating the positional relationship between each of the different layers of the laminated bus bar 100. The laminated bus bar 100 can include multiple layers. For example, the laminated bus bar 100 can include alternating layers of conductive material and non-conductive material to transfer power from a power source to components of an electric vehicle. For example, the laminated bus bar 100 can be a component of an inverter module (e.g., inverter module 450 of FIG. 4) of a drive train unit of an electric vehicle (e.g., electric vehicle 405 of FIG. 4). The laminated bus bar 100 can be a component of a single phase power module (e.g., power module 300 of FIG. 0.3) that can couple with two other single phase power modules to form a three phase inverter module of a drive train unit of an electric vehicle. The laminated bus bar 100 can be disposed or configured to couple different components of the inverter module with each other. For example, the laminated bus bar 100 can mechanically couple or electrically couple a capacitor module (e.g., capacitor module 305 of FIG. 3) with one or more transistors (e.g., transistors 325 of FIG. 3) within a power module.

The laminated bus bar 100 can include a first insulating layer 105 having a first surface 106 (e.g., top surface) and a second surface 108 (e.g., bottom surface). The first insulating layer 105 can form a bottom layer or bottom end of the laminated bus bar 100. For example, the second surface 108 of the first insulating layer 105 can correspond to a second surface or bottom surface of the laminated bus bar 100. The first insulating layer 105 can electrically insulate the laminated bus bar 100 from other components within an inverter module that the laminated bus bar 100 is coupled with, for example, but not limited to, a plastic locator. The first insulating layer 105 can include non-conductive material or insulating material, such as but not limited to, Mylar material or plastic material. The dimensions of the first insulating layer 105 can vary and be selected based at least in part on dimensions of an inverter module. For example, a length of the first insulating layer 105 can be in a range from 200 mm to 220 mm (e.g., 206 mm). A width of the first insulating layer 105 can be in a range from 60 mm to 75 mm (e.g., 66 mm). A height or thickness of the first insulating layer 105 can be in a range from 0.1 mm to 1 mm (e.g., 0.2 mm). The length, width, height, or thickness of the first insulating layer 105 can vary within or outside these ranges.

The first insulating layer 105 can include a plurality of orifices 107. The orifices 107 can include openings or holes formed through the first insulating layer 105 to allow for leads from other components of an inverter module (e.g., capacitor leads, transistor leads) to extend through or be exposed to couple with other layers of the laminated bus bar 100 (e.g., current layer 110, first polarity (e.g., negative) layer 140, second polarity (e.g., positive) layer 105) or couple with other components of the inverter module. The orifices 107 can have varying dimensions and the dimensions can be formed based at least in part on the dimensions of the leads to extend through. For example, the orifices 107 can have a diameter in a range from 3 mm to 6 mm.

The first insulating layer 105 can include at least two locator holes 109. The locator holes 109 can be holes, orifices, or hollow portions formed through the first insulating layer 105. The locator holes 109 can have the same dimensions as locator holes formed in each layer (e.g., positive layer 105, negative layer 140, current layer 110, second insulating layer 130, third insulating layer 125, and the fourth insulating layer 110) of the laminated bus bar 100. For example, the locator holes 109 can align the locator holes formed in each layer of the laminated bus bar 100 when the laminated bus bar 100 is fully assembled. The locator holes 109 can couple with a locator or locator device during a manufacturing process. For example, a locator device can use the locator holes 109 on the first insulating layer 105 to position and arrange the first insulating layer 105 during assembly of the laminated bus bar 100.

The first insulating layer 105 can include an insulating extension 104. The insulating extension 104 can be positioned or formed such that it extends parallel with respect to a surface (e.g., top surface) of the first insulating layer 105. The insulating extension 104 can have a height or thickness in a range from 0.1 mm to 5 mm. The insulating extension 104 can have a width in a range from 10 mm to 75 mm. The insulating extension 104 can have a length in a range from 5 mm to 20 mm. The height, vertical length, width, thickness, or length of the insulating extension 104 can vary within or outside these ranges. The insulating extension 104 can include non-conductive material or insulating material, such as but not limited to, Mylar material or plastic material. The insulating extension 104 can be formed to insulate an output terminal (e.g., output terminal 215) of a current layer (e.g., current layer 110) from surfaces of other components of a power module (power module 300 of FIG. 3) or other components of an inverter module (e.g., inverter module 450 of FIG. 4). For example, the insulating extension 104 can be formed or positioned such that when the laminated bus bar 100 is fully assembled (e.g., each of the layers coupled together), the insulating extension 104 is in contact with, positioned next to, or adjacent to at least one surface (e.g., bottom surface) of an AC extension portion (e.g., AC extension portion 245 of FIG. 2) of the output terminal (e.g., output terminal 215 of FIG. 2).

The laminated bus bar 100 can include a current layer 110 having a first surface 111 (e.g., top surface) and a second surface 112 (e.g., bottom surface). The second surface 112 (e.g., bottom surface) of the current layer 110 can be disposed over (e.g., coupled with or in contact with) the first surface 106 of the first insulating layer 105. The current layer 110 can include conductive material, such as but not limited to, copper or metal material. The dimensions of the current layer 110 can vary and be selected based at least in part on dimensions of a power module (e.g., power module 300 of FIG. 3). For example, a length of the current layer 110 can be in a range from 200 mm to 220 mm (e.g., 206 mm).

A width of the current layer 110 can be in a range from 60 mm to 75 mm (e.g., 66 mm). A height or thickness of the current layer 110 can be in a range from 0.5 mm to 2 mm (e.g., 1 mm). The length, width, height, or thickness of the current layer 110 can vary within or outside these ranges.

The current layer 110 can include a plurality of current leads 113. The current leads 113 can include conductive material, such as but not limited to copper. The plurality of current leads 113 can include an "S" shape, curved shape, curved stamped shape or bent shape to provide low parasitic inductance. The shape and dimensions of the current leads 113 can vary and can be selected based at least in part on the dimensions of the laminated bus bar 100 or a distance to a component of the inverter module the current leads 113 are to be coupled with. For example, the current leads 113 can couple with multiple components of an inverter module, such as but not limited to transistors and a gate drive printed circuit board (PCB). Thus, the length or height of the current leads 113 can be selected to allow or enable the current leads 113 to couple with the transistors and the gate drive PCB. The current leads 113 can have a length in a range from 2 mm to 8 mm. The current leads 113 can have a thickness or width in a range from 0.5 mm to 1.5 mm. The current leads 113 can have a height (distance extending from the first surface of the current layer 110) in a range from 1 mm to 6 mm. The thickness, width, length, or height of the current leads 113 can vary within or outside this range.

The current leads 113 can include a curved stamped projection portion 114 (or projection portions). The curved stamped projection portion 114 can provide for more reliable welds and thus a lower scrap rate during production and manufacture. For example, the curved stamped projection portion 114 can provide a stronger connection point to weld connection points from other components of an inverter module, such as transistors, to the current leads 113. The curved stamped projection portions 114 can be formed having an "S" shape, curved shape or bent shape. The curved stamped projection portions 114 can include multiple portions having different shapes. For example, the curved stamped projection portions 114 can include a first portion having a straight shape, a second portion having a curved shape, and a third portion having a straight shape.

The current layer 110 can include a plurality of orifices 115. The orifices 115 can include openings or holes formed through the current layer 110 to allow for leads from other components of an inverter module (e.g., capacitor leads, transistor leads) to extend through or be exposed to couple with other layers of the laminated bus bar 100 (e.g., negative layer 140, positive layer 105) or to couple with other components of the inverter module. The orifices 115 can have varying dimensions and the dimensions can be formed based at least in part on the dimensions of the leads to extend through. For example, the orifices 115 can have a diameter in a range from 3 mm to 6 mm.

The current layer 110 can include at least two locator holes 116. The locator holes 116 can be holes, orifices, or hollow portions formed through the current layer 110. The locator holes 116 can have the same dimensions as locator holes formed in each layer (e.g., positive layer 105, negative layer 140, the first insulating layer 105, second insulating layer 130, third insulating layer 125, and the fourth insulating layer 110) of the laminated bus bar 100. For example, the locator holes 116 can align the locator holes formed in each layer of the laminated bus bar 100 when the laminated bus bar 100 is fully assembled. The locator holes 116 can couple with a locator or locator device during a manufacturing process. For example, a locator device can use the locator holes 116 on the current layer 110 to position and arrange the current layer 110 during assembly of the laminated bus bar 100.

The laminated bus bar 100 can include a second insulating layer 120 having a first surface 122 (e.g., top surface) and a second surface 124 (e.g., bottom surface). The second surface 124 (e.g., bottom surface) of the second insulating layer 120 can be disposed over (e.g., coupled with or in contact with) a first surface 111 (e.g., top surface) of the current layer 110. The second insulating layer 120 can electrically insulate the current layer 110 from other layers within the laminated bus bar 100. The second insulating layer 120 can include non-conductive material or insulating material, such as but not limited to, Mylar material or plastic material. The dimensions of the second insulating layer 120 can vary and be selected based at least in part on dimensions of a power module. For example, a length of the second insulating layer 120 can be in a range from 200 mm to 220 mm (e.g., 206 mm). A width of the second insulating layer 120 can be in a range from 60 mm to 75 mm (e.g., 66 mm). A height or thickness of the second insulating layer 120 can be in a range from 0.1 mm to 1 mm (e.g., 0.2 mm). The length, width, height, or thickness of the second insulating layer 120 can vary within or outside these ranges.

The second insulating layer 120 can include a plurality of orifices 125. The orifices 125 can include openings or holes formed through the second insulating layer 120 to allow for current leads 113 of the current layer 110 to extend through or be exposed outside the laminated bus bar 100 to couple with other components of an inverter module. The orifices 125 can allow for leads from other components of an inverter module (e.g., capacitor leads, transistor leads) to extend through or be exposed to couple with other layers of the laminated bus bar 100 (e.g., negative layer 140, positive layer 105) or to couple with other components of the inverter module. The orifices 125 can have varying dimensions and the dimensions can be formed based at least in part on the dimensions of the leads that extend there through. For example, the orifices 125 can have a diameter in a range from 3 mm to 6 mm.

The second insulating layer 120 can include at least two locator holes 127. The locator holes 127 can be holes, orifices, or hollow portions formed through the second insulating layer 120. The locator holes 127 can have the same dimensions as locator holes formed in each layer (e.g., positive layer 105, negative layer 140, current layer 110, first insulating layer 105, third insulating layer 125, and the fourth insulating layer 110) of the laminated bus bar 100. For example, the locator holes 127 can align the locator holes formed in each layer of the laminated bus bar 100 when the laminated bus bar 100 is fully assembled. The locator holes 127 can couple with a locator or locator device during a manufacturing process. For example, a locator device can use the locator holes 127 on the second insulating layer 120 to position and arrange the second insulating layer 120 during assembly of the laminated bus bar 100.

The second insulating layer 120 can include an insulating extension 129. The insulating extension 129 can be positioned or formed such that it extends parallel with respect to a surface (e.g., top surface) of the second insulating layer 120. The insulating extension 129 can have a height or thickness in a range from 0.1 mm to 5 mm. The insulating extension 129 can have a width in a range from 10 mm to 75 mm. The insulating extension 129 can have a length in a range from 5 mm to 20 mm. The height, vertical length, width, thickness, or length of the insulating extension 129 can vary within or outside these ranges. The insulating extension 129 can include non-conductive material or insulating material, such as but not limited to, Mylar material or plastic material. The insulating extension 129 can be formed to insulate an output terminal (e.g., output terminal 215) of the current layer 110 from surfaces of other components of a power module (power module 300 of FIG. 3) or other components of an inverter module (e.g., inverter module 450 of FIG. 4). For example, the insulating extension 129 can be formed or positioned such that when the laminated bus bar 100 is fully assembled (e.g., each of the layers coupled together), the insulating extension 129 is in contact with, positioned next to, or adjacent to at least one surface (e.g., top surface) of an AC extension portion (e.g., AC extension portion 245 of FIG. 2) of the output terminal (e.g., output terminal 215 of FIG. 2).

The laminated bus bar 100 can include a third insulating layer 130 having a first surface 132 (e.g., top surface) and a second surface 134 (e.g., bottom surface). The second surface 134 (e.g., bottom surface) of the third insulating layer 125 can be disposed over (e.g., coupled with or in contact with) a first surface 122 (e.g., top surface) of the second insulating layer 120. The third insulating layer 130 can include non-conductive material or insulating material, such as but not limited to, Mylar material or plastic material. The dimensions of the third insulating layer 130 can vary and be selected based at least in part on dimensions of an inverter module. For example, a length of the third insulating layer 130 can be in a range from 200 mm to 220 mm (e.g., 206 mm). A width of the third insulating layer 130 can be in a range from 60 mm to 75 mm (e.g., 66 mm). A height or thickness of the third insulating layer 130 can be in a range from 0.1 mm to 1 mm (e.g., 0.2 mm). The length, width, height, or thickness of the third insulating layer 130 can vary within or outside these ranges.

The third insulating layer 130 can include a plurality of orifices 135. The orifices 135 can include openings or holes formed through the third insulating layer 130 to allow for current leads 113 of the current layer 110 to extend through or be exposed outside the laminated bus bar 100 to couple with other components of an inverter module. The orifices 135 can allow for leads from other components of an inverter module (e.g., capacitor leads, transistor leads) to extend through or be exposed to couple with other layers of the laminated bus bar 100 (e.g., negative layer 140, positive layer 105) or to couple with other components of the inverter module. The orifices 135 can have varying dimensions and the dimensions can be formed based at least in part on the dimensions of the leads that extend there through. For example, the orifices 135 can have a diameter in a range from 3 mm to 6 mm.

The third insulating layer 130 can include at least two locator holes 137. The locator holes 137 can be holes, orifices, or hollow portions formed through the third insulating layer 130. The locator holes 137 can have the same dimensions as locator holes formed in each layer (e.g., positive layer 105, negative layer 140, current layer 110, first insulating layer 105, second insulating layer 130, and the fourth insulating layer 110) of the laminated bus bar 100. For example, the locator holes 137 can align the locator holes formed in each layer of the laminated bus bar 100 when the laminated bus bar 100 is fully assembled. The locator holes 137 can couple with a locator or locator device during a manufacturing process. For example, a locator device can use the locator holes 137 on the third insulating layer 130 to position and arrange the third insulating layer 130 during assembly of the laminated bus bar 100.

The third insulating layer 130 can include an insulating extension 139. The insulating extension 139 can be positioned or formed such that it extends perpendicular with respect to a surface (e.g., top surface) of the third insulating layer 130. The insulating extension 139 can have a height or vertical length in a range from 2 mm to 10 mm. The insulating extension 139 can have a width or thickness in a range from 0.1 mm to 5 mm. The insulating extension 139 can have a length in a range from 5 mm to 20 mm. The height, vertical length, width, thickness, or length of the insulating extension 139 can vary within or outside these ranges. The insulating extension 139 can include non-conductive material or insulating material, such as but not limited to, Mylar material or plastic material. The insulating extension 139 can be formed to insulate a first polarity terminal (e.g., negative terminal 210) of the negative layer 140 from edge surfaces of other components of a power module (power module 300 of FIG. 3) or other components of an inverter module (e.g., inverter module 450 of FIG. 4). For example, the insulating extension 139 can be formed or positioned such that when the laminated bus bar 100 is fully assembled (e.g., each of the layers coupled together), the insulating extension 139 is in contact with, positioned next to, or adjacent to at least one surface (e.g., back surface) of the negative terminal 210. The insulating extension 139 can be formed or positioned in contact with, positioned next to, or adjacent to at least one surface (e.g., outer surface, back surface) of the negative terminal 210 that is opposite a surface of the negative terminal 210 facing the edge surfaces of the different layers of the laminated bus bar 100.

The laminated bus bar 100 can include a negative layer 140 having a first surface 142 (e.g., top surface) and a second surface 144 (e.g., bottom surface). The second surface 144 (e.g., bottom surface) of the negative layer 140 can be disposed over (e.g., coupled with or in contact with) a first surface 132 (e.g., top surface) of the third insulating layer 130. The negative layer 140 can include conductive material, such as but not limited to, copper or metal material. The dimensions of the negative layer 140 can vary and be selected based at least in part on dimensions of a power module. For example, a length of the negative layer 140 can be in a range from 200 mm to 220 mm (e.g., 206 mm). A width of the negative layer 140 can be in a range from 60 mm to 75 mm (e.g., 66 mm). A height or thickness of the negative layer 140 can be in a range from 0.5 mm to 2 mm (e.g., 1 mm). The length, width, height, or thickness of the negative layer 140 can vary within or outside these ranges.

The negative layer 140 can include a plurality of first polarity (e.g., negative) leads 148. The negative leads 148 can include conductive material, such as but not limited to copper. The plurality of negative leads 148 can include an "S" shape, curved shape, curved stamped shape or bent shape to provide low parasitic inductance. The shape and dimensions of the negative leads 148 can vary and can be selected based at least in part on the dimensions of the laminated bus bar 100 or a distance to a component of the inverter module the negative leads 148 are to be coupled with. For example, the negative leads 148 can couple with multiple components of an inverter module, such as but not limited to transistors and a gate drive printed circuit board (PCB). Thus, the length or height of the negative leads 148 can be selected to allow or enable the negative leads 148 to couple with the transistors and the gate drive PCB. The negative leads 148 can have a length in a range from 2 mm to 8 mm. The negative leads 148 can have a thickness or width in a range from 0.5 mm to 2.5 mm. The negative leads 148 can have a height (distance extending from the first surface of the negative layer 140) in a range from 1 mm to 6 mm. The thickness, width, length, or height of the negative leads 148 can vary within or outside this range.

The negative leads 148 can include a curved stamped projection portion 149 (or projection portions). The curved stamped projection portion 149 can provide for more reliable welds and thus a lower scrap rate during production and manufacture. For example, the curved stamped projection portion 149 can provide a stronger connection point to weld connection points from other components of an inverter module, such as transistors, to the negative leads 148. The curved stamped projection portions 149 can be formed having an "S" shape, curved shape or bent shape. The curved stamped projection portions 149 can include multiple portions having different shapes. For example, the curved stamped projection portions 149 can include a first portion having a straight shape, a second portion having a curved shape, and a third portion having a straight shape.

The negative layer 140 can include a plurality of orifices 145. The orifices 145 can include openings or holes formed through the negative layer 140 to allow for current leads 113 of the current layer 110 to extend through or be exposed outside the laminated bus bar 100 to couple with other components of an inverter module. The orifices 145 can allow for leads from other components of an inverter module (e.g., capacitor leads, transistor leads) to extend through or be exposed to couple with other layers of the laminated bus bar 100 (e.g., positive layer 105) or to couple with other components of the inverter module. The orifices 145 can have varying dimensions and the dimensions can be formed based at least in part on the dimensions of the leads that extend there through. For example, the orifices 145 can have a diameter in a range from 3 mm to 6 mm.

The negative layer 140 can include at least two locator holes 147. The locator holes 147 can be holes, orifices, or hollow portions formed through the negative layer 140. The locator holes 147 can have the same dimensions as locator holes formed in each layer (e.g., positive layer 105, current layer 110, first insulating layer 105, second insulating layer 120, third insulating layer 130, and the fourth insulating layer 150) of the laminated bus bar 100. For example, the locator holes 147 can align the locator holes formed in each layer of the laminated bus bar 100 when the laminated bus bar 100 is fully assembled. The locator holes 147 can couple with a locator or locator device during a manufacturing process. For example, a locator device can use the locator holes 147 on the negative layer 140 to position and arrange the negative layer 140 during assembly of the laminated bus bar 100.

The laminated bus bar 100 can include a fourth insulating layer 150 having a first surface 152 (e.g., top surface) and a second surface 154 (e.g., bottom surface). The second surface 154 (e.g., bottom surface) of the fourth insulating layer 150 can be disposed over (e.g., coupled with or in contact with) a first surface 142 (e.g., top surface) of the negative layer 140. The fourth insulating layer 150 can electrically insulate the second polarity (e.g., positive) layer 160 from the negative layer 140. The fourth insulating layer 150 can include non-conductive material or insulating material, such as but not limited to, Mylar material or plastic material. The dimensions of the fourth insulating layer 150 can vary and be selected based at least in part on dimensions of a power module. For example, a length of the fourth insulating layer 150 can be in a range from 200 mm to 220 mm (e.g., 206 mm). A width of the fourth insulating layer 150 can be in a range from 60 mm to 75 mm (e.g., 66 mm). A height or thickness of the fourth insulating layer 150 can be in a range from 0.1 mm to 1 mm (e.g., 0.2 mm). The length, width, height, or thickness of the fourth insulating layer 150 can vary within or outside these ranges.

The fourth insulating layer 150 can include a plurality of orifices 155. The orifices 155 can include openings or holes formed through the fourth insulating layer 150 to allow for current leads 113 of the current layer 110 and negative leads 148 of the negative layer 140 to extend through or be exposed outside the laminated bus bar 100 to couple with other components of an inverter module. The orifices 155 can allow for leads from other components of an inverter module (e.g., capacitor leads, transistor leads) to extend through or be exposed to couple with other layers of the laminated bus bar 100 (e.g., positive layer 160) or to couple with other components of the inverter module. The orifices 155 can have varying dimensions and the dimensions can be formed based at least in part on the dimensions of the leads that extend there through. For example, the orifices 155 can have a diameter in a range from 3 mm to 6 mm.

The fourth insulating layer 150 can include at least two locator holes 157. The locator holes 157 can be holes, orifices, or hollow portions formed through the fourth insulating layer 150. The locator holes 157 can have the same dimensions as locator holes formed in each layer (e.g., positive layer 160, negative layer 140, current layer 110, first insulating layer 105, second insulating layer 120, and the third insulating layer 130) of the laminated bus bar 100. For example, the locator holes 157 can align the locator holes formed in each layer of the laminated bus bar 100 when the laminated bus bar 100 is fully assembled. The locator holes 157 can couple with a locator or locator device during a manufacturing process. For example, a locator device can use the locator holes 157 on the fourth insulating layer 150 to position and arrange the fourth insulating layer 150 during assembly of the laminated bus bar 100.

The fourth insulating layer 150 can include an insulating extension 159. The insulating extension 159 can be positioned or formed such that it extends perpendicular with respect to a surface (e.g., top surface) of the fourth insulating layer 150. The insulating extension 159 can have a height or vertical length in a range from 2 mm to 10 mm. The insulating extension 159 can have a width or thickness in a range from 0.1 mm to 5 mm. The insulating extension 159 can have a length in a range from 5 mm to 20 mm. The height, vertical length, width, thickness, or length of the insulating extension 159 can vary within or outside these ranges. The insulating extension 159 can include non-conductive material or insulating material, such as but not limited to, Mylar material or plastic material. The insulating extension 159 can be formed to insulate a first polarity terminal (e.g., negative terminal 210) of the negative layer 140 from edge surfaces of the different layers of the laminated bus bar 100 when the laminated bus bar 100 is fully assembled. For example, the insulating extension 159 can be positioned or disposed between at least one surface (e.g., inner surface, front surface) of the negative terminal and edge surfaces of each of the different layers of the laminated bus bar 100 when the laminated bus bar 100 is fully assembled. The insulating extension 159 can be formed, positioned in contact with, positioned next to, or adjacent to at least one surface (e.g., inner surface, front surface) of the negative terminal 210 that faces the edge surfaces of the different layers of the laminated bus bar 100.

The laminated bus bar 100 can include a positive layer 160 having a first surface 162 (e.g., top surface) and a second surface 164 (e.g., bottom surface). The second surface 164 (e.g., bottom surface) of the positive layer 160 can be disposed over (e.g., coupled with or in contact with) a first surface 152 (e.g., top surface) of the fourth insulating layer 150. A first surface 162 of the positive layer 160 can correspond to a first surface or top surface of the laminated bus bar 100. The positive layer 160 can include conductive material, such as but not limited to, copper or metal material. The dimensions of the positive layer 160 can vary and be selected based at least in part on dimensions of an inverter module. For example, a length of the positive layer 160 can be in a range from 200 mm to 220 mm (e.g., 206 mm). A width of the positive layer 160 can be in a range from 60 mm to 75 mm (e.g., 66 mm). A height or thickness of the positive layer 160 can be in a range from 0.5 mm to 2 mm (e.g., 1 mm). The length, width, height, or thickness of the positive layer 160 can vary within or outside these ranges.

The positive layer 160 can include a plurality of second polarity (e.g., positive) leads 168. The positive leads 168 can include conductive material, such as but not limited to copper. The plurality of positive leads 168 can include an "S" shape, curved shape, curved stamped shape or bent shape to provide low parasitic inductance. The shape and dimensions of the positive leads 168 can vary and can be selected based at least in part on the dimensions of the laminated bus bar 100 or a distance to a component of the inverter module the positive leads 168 are to be coupled with. For example, the positive leads 168 can couple with multiple components of an inverter module, such as but not limited to transistors and a gate drive printed circuit board (PCB). Thus, the length or height of the positive leads 168 can be selected to allow or enable the positive leads 168 to couple with the transistors and the gate drive PCB. The positive leads 168 can have a length in a range from 2 mm to 8 mm. The positive leads 168 can have a thickness or width in a range from 0.5 mm to 2.5 mm. The positive leads 168 can have a height (distance extending from the first surface of the positive layer 160) in a range from 1 mm to 6 mm. The thickness, width, length, or height of the positive leads 168 can vary within or outside this range.

The positive leads 168 can include a curved stamped projection portion 169 (or projection portions). The curved stamped projection portion 169 can provide for more reliable welds and thus a lower scrap rate during production and manufacture. For example, the curved stamped projection portion 169 can provide a stronger connection point to weld connection points from other components of an inverter module, such as transistors, to the positive leads 168. The curved stamped projection portion 169 can be formed having an "S" shape, curved shape or bent shape. The curved stamped projection portion 169 can include multiple portions having different shapes. For example, the curved stamped projection portion 169 can include a first portion having a straight shape, a second portion having a curved shape, and a third portion having a straight shape.

The positive layer 160 can include a plurality of orifices 165. The orifices 165 can include openings or holes formed through the positive layer 160 to allow for current leads 113 of the current layer 110 and negative leads 148 of the negative layer 140 to extend through or be exposed outside the laminated bus bar 100 to couple with other components of an inverter module. The orifices 165 can allow for leads from other components of an inverter module (e.g., capacitor leads, transistor leads) to extend through or be exposed to couple with other components of the inverter module. The orifices 165 can have varying dimensions and the dimensions can be formed based at least in part on the dimensions of the leads that extend there through. For example, the orifices 165 can have a diameter in a range from 3 mm to 6 mm.

The positive layer 160 can include at least two locator holes 167. The locator holes 167 can be holes, orifices, or hollow portions formed through the positive layer 160. The locator holes 167 can have the same dimensions as locator holes formed in each layer (e.g., negative layer 140, current layer 110, first insulating layer 105, second insulating layer 120, third insulating layer 130, and the fourth insulating layer 150) of the laminated bus bar 100. For example, the locator holes 167 can align the locator holes formed in each layer of the laminated bus bar 100 when the laminated bus bar 100 is fully assembled. The locator holes 167 can couple with a locator or locator device during a manufacturing process. For example, a locator device can use the locator holes 167 on the positive layer 160 to position and arrange the positive layer 160 during assembly of the laminated bus bar 100.

Figure 2:
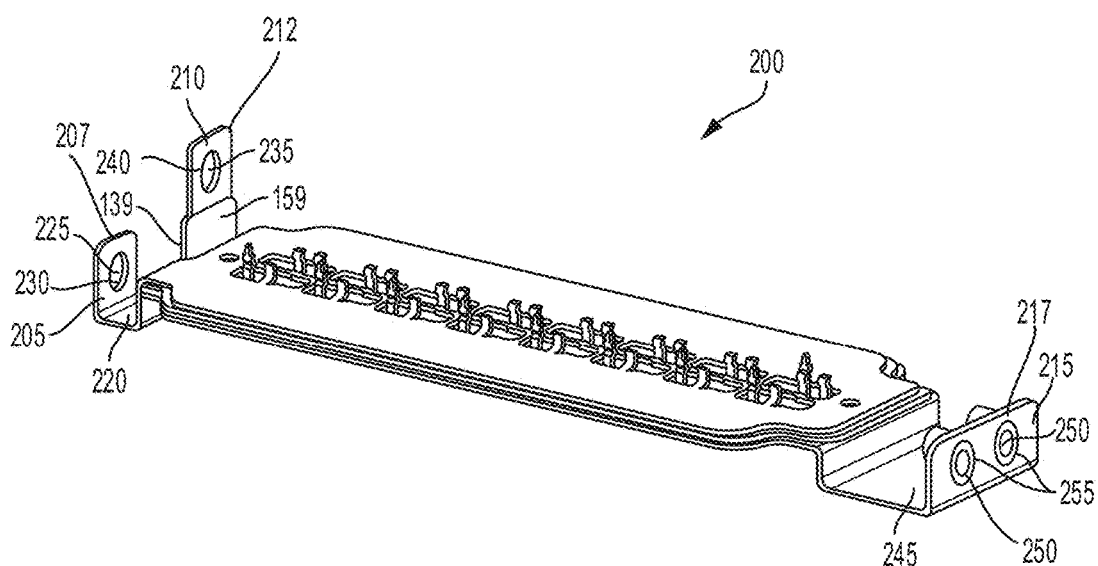
FIG. 2 depicts an example view of the laminated bus bar of FIG. 1, according to an illustrative implementation.

FIG. 2, among others, depicts a coupled view 200 of the laminated bus bar 100 having each of the different layers coupled together. The laminated bus bar 100 having the current layer 110, negative layer 140 and the positive layer 160 coupled together with insulating layers 105, 120, 130, 150 disposed between them can alternate layers of can provide or form a small inductance loop to create low overshoot during high frequency switching periods. For example, the laminated bus bar 100 can include multiple insulating layers 105, 120, 130, 150 (e.g., non-conductive material), with each of the insulating layers positioned, arranged or designed to create sufficient insulation between the respective conductive layers 110, 140 160 disposed above, below or otherwise about them. The conductive layers 110, 140, 160 of the laminated bus bar 100 can include DC portions and AC portions. For example, the laminated bus bar 100 can include a second polarity (e.g., positive) terminal 205 of the positive layer 160 that corresponds to a second polarity (e.g., positive) DC input. The laminated bus bar 100 can include a negative terminal 210 of the negative layer 140 that corresponds to a DC negative input. The laminated bus bar 100 can include an output terminal 215 of a current layer 110 that corresponds to an AC output. Thus, the positive layer 160 and the negative layer 140 can correspond to DC layers and the current layer 110 can correspond to an AC layer with one or more insulating layers 105, 120, 130, 150 disposed between the positive layer 160, the negative layer 140, and the current layer 110.

The positive terminal 205 can be a portion of the positive layer 160 or the positive terminal 205 can couple with the positive layer 160 to form a second polarity (e.g., positive) DC input terminal. For example, the positive terminal 205 can couple with a second polarity (e.g., positive) bus bar of a three phase inverter module (e.g., inverter module 450 of FIG. 4) when the laminated bus bar 100 is disposed within a power module 300. The positive terminal 205 can have a height or vertical length in a range from 10 mm to 20 mm (e.g., 16 mm). The positive terminal 205 can have a width or thickness in a range from 0.1 mm to 2 mm. The positive terminal 205 can have a length in a range from 5 mm to 20 mm. The height, vertical length, width, thickness, or length of the positive terminal 205 can vary within or outside these ranges. The positive terminal 205 can include conductive material, such as but not limited to, copper or metal material. The positive terminal 205 can include a curved stamped projection portion 207 or be formed having a curved stamped projection shape. The curved stamped projection portion 207 can provide for more reliable welds and thus a lower scrap rate during production and manufacture. For example, the curved stamped projection portion 207 can provide a stronger connection point to weld connection points from other components of an inverter module, such as a positive bus bar, to the positive terminal 205. The curved stamped projection portion 207 can be formed having an "S" shape, curved shape or bent shape.

The positive terminal 205 can include a DC extension portion 220. The DC extension portion 220 can provide clearance such that the positive terminal 205 couple with a positive bus bar of a three phase inverter module (e.g., inverter module 450 of FIG. 4) when the laminated bus bar 100 is disposed within a power module 300 and a gel tray (e.g., gel tray 345) is disposed over the laminated bus bar 100. The DC extension portion 220 can be formed to provide clearance for the positive terminal 205 from the negative terminal 210 when the laminated bus bar 100 is fully assembled. For example, the DC extension portion 220 can position the positive terminal 155 a predetermined distance from the negative terminal 210 in a lateral direction with respect to an edge surface of each of the positive layer 160 and the negative layer 140. The DC extension portion 220 can have a length to position the positive terminal 205 at a different distance from an edge surface of each of the positive layer 160 and the negative layer 140 as compared to the negative terminal 210 in a lateral direction. For example, the DC extension portion 220 can have a length (e.g., distance from an edge surface of the positive layer 160 to the positive terminal 205) in a range from 1 mm to 15 mm. The DC extension portion 220 can have a height or thickness in a range from 3 mm to 15 mm. The DC extension portion 220 can have a width in a range from 5 mm to 20 mm. The height, vertical length, width, thickness, or length of the DC extensions portion 220 can vary within or outside these ranges. The DC extension portion 220 can include conductive material, such as but not limited to, copper or metal material.

The positive terminal 205 can include an insert orifice 225. The insert orifice 225 can include an orifice, hole, aperture or hollow portion formed through the positive terminal 205 to provide for a connection point to other components of an inverter module. For example, the insert orifice 225 can receive or engage various types of fasteners, screws, bolts or other types of connection devices or instruments to couple the laminated bus bar 100 with other components of an inverter module, such as but not limited to a positive bus bar of the inverter module. The insert orifice 225 can include a non-threaded inner surface or a threaded inner surface. The insert orifice 225 can include an insulating washer 230. The insulating washer 230 can be disposed around an inner surface or inner edge of the insert orifice 225. The insulating washer 230 can electrically isolate or electrically insulate the positive terminal 205 from fasteners, bolts screws or other forms of connection devices used to couple the positive terminal 205 to other components of an inverter module, such as but not limited to a positive bus bar of the inverter module.

The negative terminal 210 can be a portion of the negative layer 140 or the negative terminal 210 can couple with the negative layer 140 to form a DC first polarity (e.g., negative) input terminal. For example, the negative terminal 210 can couple with a first polarity (e.g., negative) bus bar of a three phase inverter module (e.g., inverter module 450 of FIG. 4) when the laminated bus bar 100 is disposed within a power module 300. The negative terminal 210 can have a height or vertical length in a range from 10 mm to 20 mm (e.g., 16 mm). The negative terminal 210 can have a width or thickness in a range from 0.1 mm to 5 mm. The negative terminal 210 can have a length in a range from 5 mm to 20 mm. The height, vertical length, width, thickness, or length of the negative terminal 210 can vary within or outside these ranges. The negative terminal 210 can include conductive material, such as but not limited to, copper or metal material. The negative terminal 210 can include a curved stamped projection portion 212 or be formed having a curved stamped projection shape. The curved stamped projection portion 212 can provide for more reliable welds and thus a lower scrap rate during production and manufacture. For example, the curved stamped projection portion 212 can provide a stronger connection point to weld connection points from other components of an inverter module, such as a negative bus bar, to the negative terminal 210. The curved stamped projection portion 212 can be formed having an "S" shape, curved shape or bent shape.

As depicted in FIG. 2, with the laminated bus bar 100 fully assembled, a first insulating extension 159 of the fourth insulating layer 150 can be positioned or disposed between an inner surface of the negative terminal 210 and edge surfaces of each of the different layers of the laminated bus bar 100. A second insulating extension 139 can be coupled with, in contact with, or adjacent to an outer surface of the negative terminal 210. The first and second insulating extensions 159, 139 can electrically isolate the negative terminal 210 from the other layers of the laminated bus bar 100, other components of a power module (e.g., power module 300) that the laminated bus bar 100 is disposed within or other components of a inverter module (e.g., inverter module 300) that the laminated bus bar 100 is disposed within.

The negative terminal 210 can include an insert orifice 235. The insert orifice 235 can include an orifice, hole, aperture or hollow portion formed through the negative terminal 210 to provide for a connection point to other components of an inverter module. For example, the insert orifice 235 can receive or engage various types of fasteners, screws, bolts or other types of connection devices or instruments to couple the laminated bus bar 100 with other components of an inverter module, such as but not limited to a negative bus bar of the inverter module. The insert orifice 235 can include a non-threaded inner surface or a threaded inner surface. The insert orifice 235 can include an insulating washer 240. The insulating washer 240 can be disposed around an inner surface or inner edge of the insert orifice 235. The insulating washer 240 can electrically isolate or electrically insulate the negative terminal 210 from fasteners, bolts screws or other forms of connection devices used to couple the negative terminal 210 to other components of an inverter module, such as but not limited to a negative bus bar of the inverter module.

The output terminal 215 can be a portion of the current layer 110 or the output terminal 215 can couple with the current layer 110 to form an AC output terminal. For example, the output terminal 215 can couple with a phase bus bar (e.g., output bus bar) of a three phase inverter module (e.g., inverter module 450 of FIG. 4) when the laminated bus bar 100 is disposed within a power module 300. The output terminal 215 can have a height or vertical length in a range from 10 mm to 20 mm (e.g., 16 mm). The output terminal 215 can have a width or thickness in a range from 0.1 mm to 5 mm. The output terminal 215 can have a length in a range from 10 mm to 75 mm. The height, vertical length, width, thickness, or length of the output terminal 215 can vary within or outside these ranges. The output terminal 215 can include conductive material, such as but not limited to, copper or metal material. The output terminal 215 can include a curved stamped projection portion 217 or be formed having a curved stamped projection shape. The curved stamped projection portion 217 can provide for more reliable welds and thus a lower scrap rate during production and manufacture. For example, the curved stamped projection portion 217 can provide a stronger connection point to weld connection points from other components of an inverter module, such as a phase bus bar, to the output terminal 215. The curved stamped projection portion 217 can be formed having an "S" shape, curved shape or bent shape.

The output terminal 215 can include an AC extension portion 245. The AC extension portion 245 can have a height or thickness in a range from 0.1 mm to 2 mm. The AC extension portion 245 can have a width in a range from 10 mm to 75 mm. The AC extension portion 245 can have a length (e.g., distance from an edge surface of the current layer 110 to the output terminal 215) in a range from 1 mm to 20 mm. The height, vertical length, width, thickness, or length of the AC extensions portion 245 can vary within or outside these ranges. The AC extension portion 245 can include conductive material, such as but not limited to, copper or metal material. When the laminated bus bar 100 is fully assembled, a first insulating extension 104 of the first insulating layer 105 and a second insulating extension 129 of the second insulating layer 120 can be positioned or disposed under and over, respectively the AC extension portion 245 to electrically isolate the AC extension portion 245 and the output terminal 215 from the other layers of the laminated bus bar 100, other components of a power module (e.g., power module 300) that the laminated bus bar 100 is disposed within or other components of a inverter module (e.g., inverter module 300) that the laminated bus bar 100 is disposed within. For example, the first insulating extension 104 can be in contact with or disposed adjacent to a bottom surface of the AC extension portion 245 and the second insulating extension 129 can be in contact with or disposed adjacent to a top surface of the AC extension portion 245.

The output terminal 215 can include one or more insert orifices 250. For example, and as depicted in FIG. 2, the output terminal 215 can include two insert orifices 250. The insert orifices 250 can include an orifice, hole, aperture or hollow portion formed through the output terminal 215 to provide for a connection point to other components of an inverter module. For example, the insert orifices 250 can receive or engage various types of fasteners, screws, bolts or other types of connection devices or instruments to couple the laminated bus bar 100 with other components of an inverter module, such as but not limited to a phase bus bar of the inverter module. The insert orifices 250 can include a non-threaded inner surface or a threaded inner surface. The insert orifices 250 can each include an insulating washer 255. The insulating washers 255 can be disposed around an inner surface or inner edge of the insert orifices 250. The insulating washers 255 can electrically isolate or electrically insulate the output terminal 215 from fasteners, bolts screws or other forms of connection devices used to couple the output terminal 215 to other components of an inverter module, such as but not limited to a phase bus bar of the inverter module.

The dimensions of the laminated bus bar 100 when fully assembled (e.g., as depicted in FIG. 2) can vary and be selected based at least in part on dimensions of an inverter module. For example, a length of the laminated bus bar 100 can be in a range from 200 mm to 220 mm (e.g., 206 mm). A width of the laminated bus bar 100 can be in a range from 60 mm to 75 mm (e.g., 66 mm). A height or thickness of the laminated bus bar 100 can be in a range from 3 mm to 6 mm (e.g., 3.8 mm, 4 mm). The length, width, height, or thickness of the laminated bus bar 100 can vary within or outside these ranges. The laminated bus bar 100 can include or provide appropriate spacing between terminals or leads of the different layers. The terminals or leads can include a curve stamped shape to provide for easy and reliable connection points, such as through welding. The laminated bus bar 100 as described here can provide adequate cross-section area between an AC terminal (e.g., output terminal 215) and DC terminals (e.g., positive input terminal 205, negative input terminal 210) to maintain a predetermined or desired temperature for each layer of the laminated bus bar 100. For example, the predetermined or desired temperature for each layer of the laminated bur bar 100 can range from 20° C. to 60° C.

The order of the different layers of the laminated bus bar 100 can be selected to reduce an inductance value, such as but not limited to, reducing an inductance during high frequency switching periods. For example, the laminated bus bar 100 as depicted in FIG. 2, among others, includes the positive layer 160, the negative layer 140 and the current layer 110 (e.g., AC layer) in a predetermined order or arrangement. The positive layer 160 is disposed in a top portion of the laminated bus bar 100. The negative layer 140 is disposed in a middle portion of the laminated bus bar 100. The current layer 110 is disposed in a bottom portion of the laminated bus bar 100. The order of the positive layer 160, the negative layer 140 and the current layer 110 can reduce an inductance during high frequency switching periods within an inverter module. The dimensions of the insulating layers 110, 120, 130, 150 or number of insulating layers between the positive layer 160, the negative layer 140, and the current layer 110 can be selected to contain, minimize or reduce an edge electric field between the positive layer 160, the negative layer 140, and the current layer 110. For example, the insulating layers 110, 120, 130, 150 coupled with, in contact with, disposed proximate to, or disposed adjacent to can have the same or substantially the same shape or geometry of the positive layer 160, the negative layer 140, or the current layer 110 they are coupled with to contain, minimize or reduce an edge electric field. For example, and as depicted in FIG. 2, the fourth insulating layer 150 can have the same shape or geometry as the positive layer 160. The third insulating layer 130 can have the same shape or geometry as the negative layer 140. The fourth insulating layer 150 or the third insulating layer 130 can have the same shape or geometry as the current layer 110. One or more of the geometries, dimensions, size, materials, and properties of the first insulating layer 160, second insulating layer 120, third insulating layer 130 and the fourth insulating layer 150 can be different from between one or more of the first insulating layer 105, second insulating layer 120, third insulating layer 130 and the fourth insulating layer 150 to create or provide greater high voltage insulation. The geometries, dimensions, size, materials, and properties of the first insulating layer 105, second insulating layer 120, third insulating layer 130 and the fourth insulating layer 150 may be the same. A spacing between each of the different layers of the laminate bus bar 100 can correspond to a thickness of a layer disposed between the two respective layers. For example, a distance between the positive layer 160 and the negative layer 140 can correspond to the thickness or height of the fourth insulating layer 150.

The positive terminal 205 and the negative terminal 210 can be spaced a predetermined distance from each other along at least one edge surface of the laminated bus bar 100. The predetermined distance between the positive terminal 205 and the negative terminal 210 can be selected based in part on a desired inductance value or a reduced inductance value for a power module (e.g., power module 300 of FIG. 3) or of an invert module (e.g., reduced EMI noise within the inverter module). For example, the positive terminal 205 can be spaced a distance in a range from 5 mm to 30 mm from the negative terminal 210 along at least one edge surface of the laminated bus bar 100. The distance between the positive terminal 205 and the negative terminal 210 may vary within or outside this range, while reducing an inductance value of the power module and maintaining a desired or required clearance for insulation and manufacturability.

Figure 3:
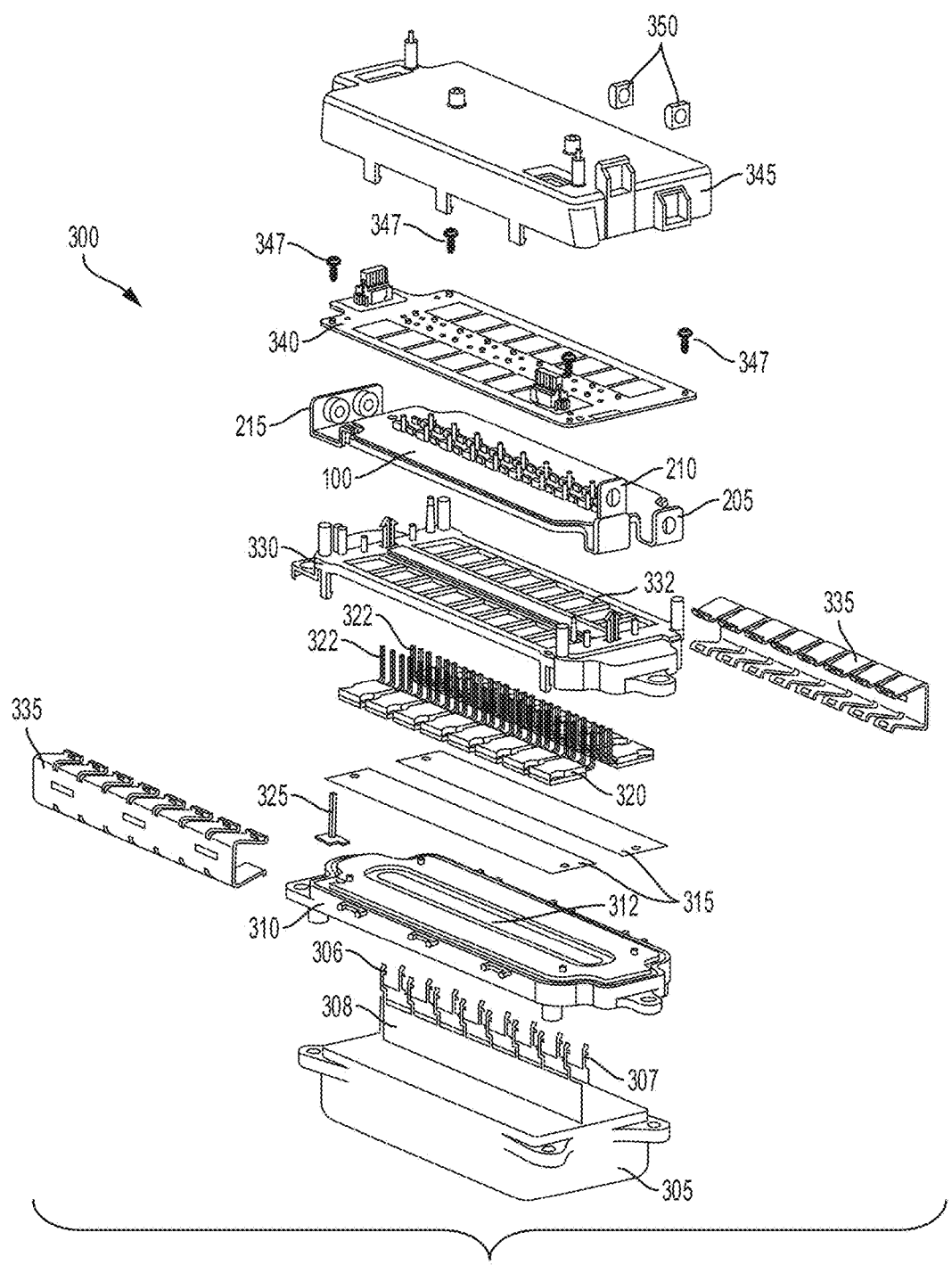
FIG. 3 is an example exploded view of a single phase power module of a multiple phase inverter module of a drive unit of an electric vehicle; according to an illustrative implementation.

FIG. 3, among others, depicts a cross-sectional view of a power module 300. The power module 300 can include at least one laminated bus bar 100. The power module 300 can be one power module of a multiple phase inverter module (e.g., inverter module 450 of FIG. 4) disposed within a drive train unit of an electric vehicle (e.g., electric vehicle 405 of FIG. 4) to power the respective electric vehicle. For example, the power module 300 can couple with two other power modules 300 in a triplet configuration to form a three-phase inverter module (e.g., inverter module 450 of FIG. 4). Each of the power modules 300 can be formed having the same components and dimensions to provide inverter functionality based at least in part on the modular design (e.g., ease of assembly) and ability to be adapted for a variety of different inverter applications. The power module 300 can be formed having a length in a range from 220 mm to 230 mm. The power module 300 can be formed having a width in a range from 80 mm to 90 mm. The power module 300 can be formed having a height in a range from 60 mm to 70 mm. The dimensions and size of the power modules 300 described herein can vary outside these ranges.

As depicted in FIG. 3, the power module 300 can include at least one capacitor module 305 having a first surface (e.g., top surface) and a second surface (e.g., bottom surface). The capacitor module 305 can include DC-Link, Single-Phase Capacitors ("DCLSP Capacitors") used as X capacitors, DC-Link filtering capacitors or automotive, industrial, or commercial inverters. The capacitor module 305 can include a housing or outer surface that can be formed from a variety of different materials, including but not limited to, plastic material or non-conductive material. The dimensions of the capacitor module 305 can vary and can be selected based at least in part on the dimensions of the power module 300. For example, the capacitor module 305 can have a length in a range from 140 mm to 155 mm (e.g., 150 mm). The capacitor module 305 can have a width in a range from 60 mm to 70 mm (e.g., 66 mm). The capacitor module 305 can have a height in a range from 30 mm to 40 mm (e.g., 32 mm).

The capacitor module 305 can include terminals 306, 307 and a divider 308. The terminals 306, 307 can include second polarity (e.g., positive) terminals 306 and first polarity (e.g., negative) terminals 307. For example, positive terminals 306 can extend from or be coupled with a first side surface of the divider 308 and negative terminals 307 can extend from or be coupled with a second side surface of the divider 308. Thus, the divider 308 can be disposed or otherwise positioned to separate the positive terminals 306 from the negative terminals 307 of the capacitor module 305. The capacitor module 305 can include one or more capacitor elements (not shown) disposed within the capacitor module 305. For example, the capacitor module 305 can house a single capacitor film roll or multiple capacitor film rolls (e.g., three to four capacitor film rolls). The capacitor film rolls can be coupled with the positive terminals 306 and the negative terminals 307 through one or more tabs. The capacitor film rolls and thus the capacitor module 305 can have a capacitance value of 200-400 nanofarads (nF), e.g., 300 nF. The capacitance value can vary within or outside this range.

The positive terminals 306 can correspond to leads or terminals of a positive bus bar of the capacitor module 305. The negative terminals 307 can correspond to leads or terminals of a negative bus bar of the capacitor module 305. For example, the capacitor module 305 can include a positive bus bar and a negative bus bar, for example, disposed within the housing of the capacitor module 305. The positive terminals 306 can include leads, terminals or extensions of the positive bus bar that extend out of the capacitor module 305 to couple with leads of other components of the power module 300, such as but not limited to, transistors (e.g., leads 320 of transistors 315) of the power module 300. The negative terminals 307 can include leads, terminals or extensions of the negative bus bar that extend out of the capacitor module 305 to couple with leads of other components of the power module 300, such as but not limited to, transistors (e.g., leads 320 of transistors 315) of the power module 300.

The divider 308 can be disposed between the positive terminals 306 and the negative terminals 307 to electrically isolate or electrically insulate the positive terminals 306 and the negative terminals 307. The shape and dimensions of the divider 308 can vary and can be selected based at least in part on the shape and dimensions of the positive terminals 306 and the negative terminals 307. For example, a thickness or width of the divider 308 can be in a range from 0.5 mm to 1.5 mm. A length of the divider 308 can be in a range from 130 mm to 145 mm (e.g., 140 mm). A height of the divider 308 can be in a range from 20 mm to 30 mm (e.g., 25 mm). The thickness, width, length or height of the divider 308 can vary within or outside these ranges.

The power module 300 can include at least one heat sink 310 having a first surface (e.g., top surface) and a second surface (e.g., bottom surface). The second surface of the heat sink 310 can be coupled with, disposed over or otherwise in contact with the first surface of the capacitor module 305. For example, the positive terminals 306, the negative terminals 307, and the divider 308 can extend through an inner open region of the heat sink 310. The heat sink 310 can include a variety of different materials, such as but not limited to, conductive material, metal material, metallic material or aluminum. The heat sink 310 can provide active cooling to the capacitor module 305. For example, the heat sink 310 can be disposed proximate to at least one surface, here the first surface (e.g., top surface) of the capacitor module 305 and the heat sink 310 can provide active cooling to the first surface of the capacitor module 305. For example, the heat sink 310 can have a shape that defines one or more cooling channels formed within the heat sink 310. The cooling channels can receive and be shaped to allow coolant to flow through the heat sink 310 such that the heat sink 310 can provide active cooling to components and electronics (e.g., capacitor module 305, transistors 320) disposed proximate to surfaces of the heat sink 310.

The heat sink 310 can have a length in a range from 200 mm to 225 mm (e.g., 215 mm). The heat sink 310 can have a height (e.g., thickness) in a range from 5 mm to 20 mm (e.g., 10 mm). The heat sink 310 can have a width in a range from 45 mm to 65 mm (e.g., 52 mm). The length, height, and width of the heat sink 310 can vary within and outside these ranges. The heat sink 310 can be disposed within the power module 300 such that the heat sink 310 surrounds, is disposed about, or disposed around a portion of terminals 306, 307 of the capacitor module 305 that couple with transistors (e.g., transistors 320) of the power module 300. For example, the heat sink 310 can include an open inner region 312 (e.g., hole, orifice) formed in a middle portion of the heat sink 310. The capacitor module 305 can couple with the heat sink 310 such that the divider 308, positive terminals 306, and negative terminals 307 extend through the open inner region 312 of the heat sink 310. Thus, the heat sink 310 can be positioned such that it surrounds surfaces of the divider 308, positive terminals 306, and negative terminals 307 to provide active cooling to the divider 308, positive terminals 306, negative terminals 307, and transistors. For example, in operation, the capacitor module 305 can generate heat and may not receive enough cooling (e.g., passive cooling, active cooling). The heat generation inside the capacitor module 305 can reduce the life of the respective capacitor module 305 if not properly dissipated. The heat sink 310 can be positioned such that cool surfaces and coolant flowing through the heat sink 310 are disposed closer to these electrical components. Thus, the heat sink 310 can provide active cooling to each of the capacitor module 305, the positive terminals 306, the negative terminals 307, and transistors of the power module 300 to reduce inductance value in the power module 300 and reduce EMI noise in the inverter module. The heat sink open inner region 312 can have a width in a range from 10 mm to 20 mm (e.g., 12 mm). The heat sink open inner region 312 can have a length in a range from 140 mm to 120 mm (e.g., 150 mm). The heat sink open inner region 312 can have a height (or depth) in a range from 3 mm to 15 mm (e.g., 4 mm, 8 mm). The width, length, or height of the heat sink open inner region 312 can vary within or outside these ranges.

The power module 300 can include one or more ceramic plates 315 coupled to, disposed over or otherwise in contact with the first surface of the heat sink 310. For example, and as depicted in FIG. 3, the power module 300 can include first and second ceramic plates 315. Each of the first and second ceramic plates 315 can include a first surface (e.g., top surface) and a second surface (e.g., bottom surface). Each of the second surfaces of the first and second ceramic plates 315 can couple with, be disposed over or otherwise in contact with the first surface of the heat sink 310. The ceramic plates 315 can insulate the heat sink 310 from one or transistors (e.g., transistors 320) disposed within the power module 300. The ceramic plates 315 may include ceramic based material and can electrically insulate the heat sink 310 from transistors (e.g., transistors 320) disposed within the power module 300. For example, the ceramic plates 315 can prevent a short circuit condition between the heat sink 310 and the transistors (e.g., transistors 320) disposed within the power module 300. The ceramic plates 315 can have a length in a range from 100 mm to 250 mm. The ceramic plates 315 can have a width in a range from 40 mm to 55 mm. The ceramic plates 315 have a height (or thickness) in a range from 2 mm to 10 mm.

The power module 300 can include a plurality of transistors 320. The plurality of transistors 320 can couple with, be disposed over or otherwise in contact with the first surface of the ceramic plates 315. Each of the transistors 315 can include a plurality of leads 322. The transistors 320 can include discrete insulated-gate bipolar transistors (IGBT's), IGBT semiconductor dies, TO-247 transistors, or TO-247 discreet IGBT packages (e.g., TO-247 transistors, switches). Each of the transistors 320 can include one or more leads 320. For example, each of the transistors 320 may include three leads 322. Each of the three leads 322 can corresponds to at least one of the terminals of the transistor 320. For example, a first lead 322 can correspond to the base terminal or base lead. A second lead 322 can correspond to the collector terminal or collector lead. A third lead 322 can correspond to the emitter terminal or emitter lead. The leads 322 can have a generally straight or unbent shape. When the transistors 320 are fully coupled within the power module 300, the leads 322 can be bent, shaped or otherwise manipulated to couple with a respective one or more components (e.g., gate drive PCB 340, capacitor module 305) within the power module 300. For example, the leads 320 can be formed such that they extend perpendicular with respect to a first surface (e.g., top surface) of the transistors 320. For example, the leads 322 can be formed such that they have a bent shape and extend up with respect to a first surface (e.g., top surface) of the transistors 320.

The plurality of transistors 320 can be organized in a predetermined arrangement. For example, the plurality of transistors 320 can be disposed in one or more rows having multiple transistors 320 and the rows can be disposed such that the leads 322 of each of the transistors 320 are proximate to or adjacent to each other to allow for ease of coupling with components (e.g., gate drive PCB 340) of the power module 300. For example, a first plurality of transistors 320 can be arranged in a first row and a second plurality of transistors 320 can be arranged in a second row. Each of the rows of transistors 320 may include the same number of transistors or the rows of transistors 320 may include a different number of transistors 320. The transistors 320 in the same row can be positioned such that one or more side edges are in contact with a side edge of a single transistor 320 or two transistors 320 of the same row (e.g., one transistor 320 on each side). Thus, the transistors 320 can be arranged in a uniformed row along the first surface of the ceramic plates 315. The first plurality of transistors 320 can be spaced from the second plurality of transistors 320. The first plurality of transistors 320 can be evenly spaced or symmetrically from the second plurality of transistors 320 with respect to the first surface of the ceramic plates 315. For example, each of the transistors 320 in the first plurality of transistors 320 can be spaced the same distance from a corresponding transistor 320 of the second plurality of transistors 320. The first plurality of transistors 320 can be asymmetrically spaced from the second plurality of transistors 320 with respect to the first surface of the ceramic plates 315. For example, one or more of the transistors 320 in the first plurality of transistors 320 can be spaced different distances from corresponding transistors 320 of the second plurality of transistors 320. The one or more of the transistors 320 in the first plurality of transistors 320 can be spaced with respect to each other with a pitch (e.g., center to center spacing) in a range from 15 mm to 20 mm (e.g., 17.5 mm). The one or more of the transistors 320 in the second plurality of transistors 320 can be spaced with respect to each other with a pitch (e.g., center to center spacing) in a range from 15 mm to 20 mm (e.g., 17.5 mm). The one or more of the transistors 320 in the first plurality of transistors 320 can be spaced with respect to the one or more transistors 320 in the second plurality of transistors 320 in a range from 10 mm to 20 mm (e.g., 14 mm).

The power module 300 can include at least one temperature sensor 325 such as at least one transistor temperature sensing printed circuit board (PCB) 325. The transistor temperature sensing PCB 325 can include control electronics to communicate or monitor temperatures of different components of the power module 300, such as but not limited to transistors 320. For example, the transistor temperature sensing PCB 325 can be disposed proximate to the plurality of transistors 320 to provide temperature data corresponding to the plurality of transistors 320. For example, the transistor temperature sensing PCB 325 can be disposed between the ceramic plates 315 and the plurality of transistors 320 or between the heat sink 310 and the ceramic plates 315. The transistor temperature sensing PCB 325 can collect or retrieve temperature data corresponding to the plurality of transistors 320. The transistor temperature sensing PCB 325 can collect or retrieve temperature data corresponding to individual transistors 320, groups of transistors 320 or all of the plurality of transistors 320 collectively. For example, the temperature sensing can be extrapolated to predict IGBT junction temperatures. The transistor temperature sensing PCB 325 may be positioned such that it is compressed and sealed against a pocket of grease on the ceramic, adjacent to the transistors 320. For example, the transistor temperature sensing PCB 325 can be disposed a distance from the transistors 320 that ranges from 0 mm (e.g., in contact) to 2 mm. The distance between the transistor temperature sensing PCB 325 can vary outside these ranges.

The power module 300 can include a locator 330 (which can also be referred to herein as a locator guide or locator frame). The locator 330 can include a first surface (e.g., top surface) and a second surface (e.g., bottom surface). The second surface of the locator 330 can couple with, be disposed over or in contact with the first surface of the ceramic plates 315 or the heat sink 310. The locator 330 can include non-conductive material or plastic material. The locator 330 can have a length in a range from 200 mm to 225 mm (e.g., 215 mm). The locator 330 can have a height (e.g., thickness) in a range from 5 mm to 20 mm (e.g., 10 mm). The locator 330 can have a width in a range from 45 mm to 65 mm (e.g., 52 mm). The length, height, and width of the locator 330 can vary within and outside these ranges. The locator 330 can includes a plurality of slots 332 (e.g., apertures, holes, recesses) formed in a frame of the locator 330 to hold or couple various components of the power module 300 in place. The locator 330 can include the plurality of slots 332 to hold or couple with the transistors 320. At least one transistor 320 of the plurality of transistors 320 can be disposed or coupled with at least one slot 332 of the locator 330.

A plurality of clips 335 can couple the transistors 320 with the locator 330 (e.g., hold the transistors 320 in the slots 332 of the locator 330). For example, each of the plurality of transistors 320 can be disposed within at least one slot 332 of the locator 330 and the clips 335 can include spring clips that couple onto a side portion of the locator 330 and the transistors 320 to hold or compress the transistors 320 within a respective slot 332 to hold the transistors 320 in place and in contact with the locator 330. Fasteners 347 may be used to couple the transistors 320 with the locator 330. The locator 330 can include a plastic locator or plastic material.

The slots 332 of the locator 330 can include apertures, holes, recesses formed in a frame of the locator 330. The slots 332 can have varying shapes, sizes and dimensions and the shapes, sizes and dimensions of a particular slot 332 can be selected based at least in part on the shape, size or dimension of a component of the power module 300. For example, the locator 330 may include slots 332 for transistors 320, fasteners, clips, thermistors or thermal pads. The transistors slots have a generally rectangular shape which can be selected based on the particular transistor 320 to be used in the power module 300. The fastener slots can have a generally round shape and may include a threaded inner surface to couple with a threaded portion of a fastener. The thermistor slots can have a generally round shape. The power module 300 may include only one thermistor, thus only one thermistor slot may be used. However, two thermistor slots can be formed to provided symmetry and ease of manufacture. For example, having two thermistor slots can allow for the locator 330 to be rotated and a thermistor of the power module 300 can be disposed within either thermistor slot. The locator 330 can be formed having any number of slots 332, and the number of slots 332 can be selected based at least on the type of components of the power module 300. For example, the total number of slots 332 formed in the locator 330 can range from eight slots 332 to twenty four slots 332.

The locator 330 can operate as a guide or frame for a manufacture process of the power module 300, such as during a pick and place automation process, to increase an efficiency of the manufacture process. For example, the locator 330 can keep different components or parts of the power module 300 from moving around during manufacture resulting in a reducing an amount of fixturing (e.g., identifying and moving parts to correct locations) during the manufacture process. The power module 300 can be formed faster and more efficiently using the locator 330 as a guide for an automation device (e.g., pick and place automation machinery). The locator 330 can reduce the amount of human interaction with a particular manufacture process and therefore, the power module 300 can be formed using just the pick and place machinery and a grease dispenser device (or other form of fluid device).

The power module 300 can include a laminated bus bar 100. The laminated bus bar 100 can include a first surface (e.g., top surface) and a second surface (e.g., bottom surface). The second surface of the laminated bus bar 100 can couple with, be disposed over or in contact with the first surface of the locator 330 and portions of the first surface of the transistors 320 disposed in the slots 332 of the locator 330. The leads 322 of the transistors 320 can couple with portions of the laminated bus bar 100. For example, the laminated bus bar 100 can include a plurality of leads 148. Each of the plurality of leads 148 of the laminated bus bar 100 can couple with at least one lead 322 of the plurality of transistors 320. For example, at least two leads 148 of the laminated bus bar 100 can couple with at least two leads 148 of a transistor 320 of the plurality of transistors 320. The laminated bus bar 100 can have a length in a range from 200 mm to 225 mm. The laminated bus bar 100 can have a height (e.g., thickness) in a range from 3 mm to 20 mm. The laminated bus bar 100 can have a width in a range from 45 mm to 65 mm. The length, height, and width of the laminated bus bar 100 can vary within and outside these ranges. The laminated bus bar 100 can include or conductive material, such as but not limited to copper.

The laminated bus bar 100 can include includes two input terminals 205, 210 (e.g., positive input terminal 205 and negative input terminal 210) disposed at or along a first edge surface and an output terminal 215 disposed at a second, different edge surface of the laminated bus bar 100. For example, the two input terminals 205, 210 can be disposed at an opposite or opposing side as compared to the output terminal 215. The first and second input terminals 205, 210 can include conductive material, such as but not limited to copper. The first and second input terminals 205, 210 can be formed in a variety of different shapes to accommodate coupling with an inverter bus bar (e.g., positive bus bar, negative bus bar). The first and second input terminals 205, 210 can have or include a straight shape, or a curved or bent shape. For example, the first and second input terminals 205, 210 can include a first portion (e.g., DC extension portion) that is parallel with respect to a first surface (e.g., top surface) of the laminated bus bar 100 and a second portion that is perpendicular with respect to the first surface of the laminated bus bar 100. The first input terminal 205 can couple with a positive inverter bus-bar (not shown) to receive a second polarity (e.g., positive) voltage and provide the positive voltage to the power module 300. The second input terminal 210 can couple with a negative bus-bar (not shown) to receive a first polarity (e.g., negative) voltage and provide the negative voltage to the power module 300. The first input terminal 205 can be disposed at a different level or height with respect to the side surface of the laminated bus bar 100 as compared with the second input terminal 210. For example, the first input terminal 205 can be disposed at first level or first height and the second input terminal 210 can be disposed at a second level or second height. The first level or first height can be greater than the second level or the second height. The first level or first height can be less than the second level or the second height.

The output terminal 215 can include conductive material, such as but not limited to copper. The output terminal 215 can be formed in a variety of different shapes to accommodate coupling with an inverter phase bus bar (not shown). The output terminal 215 can be formed having a straight shape, or a curved or bent shape. For example, the output terminal 215 can include a first portion (e.g., AC extension portion) that is parallel with respect to a first surface (e.g., top surface) of the laminated bus bar 100 and a second portion that is perpendicular with respect to the first surface of the laminated bus bar 100. The output terminal 215 can couple with a phase bus-bar (not shown) to provide power generated by the power module 300 to other electrical components of an electric vehicle.

The power module 300 can include a gate drive printed circuit board (PCB) 340. The gate drive PCB 340 can include a first surface (e.g., top surface) and a second surface (e.g., bottom surface). The second surface of gate drive PCB 340 can couple with, be disposed over or in contact with the first surface of the laminated bus bar 340. The gate drive PCB 340 can include control electronics to control one or more components of the power module 300 or communication electronics to communicate with and receive from or transmit signals to a control board of an inverter module. The gate drive PCB 340 can include control electronics and can generate and provide control signals to the transistors 320. For example, the leads 322 of the transistors 320 can extend through the locator 330 and the laminated bus bar 340 to couple with a portion or surface of the gate drive PCB 340. The gate drive PCB 340 can generate control signals, for example, to turn one or more of transistors 320 on or off, open or close. The gate drive PCB 340 can have a length in a range from 140 mm to 220 mm. The gate drive PCB 340 can have a height (e.g., thickness) in a range from 5 mm to 10 mm. The gate drive PCB 340 can have a width in a range from 60 mm to 100 mm. The length, height, and width of the gate drive PCB 340 can vary within and outside these ranges.

The power module 300 can include a dielectric gel tray 345. The dielectric gel tray 345 can include a first surface (e.g., top surface), a second surface (e.g., bottom surface) and can define an inner region that includes the second surface. The second surface of the dielectric gel tray 345 can couple with, be disposed over or contact the gate drive PCB 340. The dielectric gel tray 345 can couple with the capacitor module 305 though one or more fasteners 347. For example, the dielectric gel tray 345 can form a housing that is disposed over the gate drive PCB 340, laminated bus bar 100, locator 330, transistors 320, transistor temperature sensing PCB 325, the ceramic plates 315, the heat sink 310 such that that each of the gate drive PCB 340, laminated bus bar 100, locator 330, transistors 320, transistor temperature sensing PCB 325, the ceramic plates 315, and the heat sink 310 are disposed within the inner region defined by the dielectric gel tray 345 and thus covered by the dielectric gel tray 345 when the dielectric gel tray 345 is coupled with the capacitor module 305. For example, the dielectric gel tray 345 can include or be formed having an inner region that covers, submerges, or can be disposed about multiple components of the power module 300.

The dielectric gel tray 345 (e.g., potting compound container) can include poly carbon material, or other forms of high temperature plastic. The dielectric gel tray 345 can be formed using various injection molded techniques. The dielectric gel tray 345 can be disposed over one or more components of the power module 300 and operate as an insulator for the components (e.g., electronics) of the power module 300. The gel tray 345 can be formed having a length in a range from 160 mm to 240 mm. The gel tray 345 can be formed having a width in a range from 80 mm to 90 mm. The gel tray 345 can be formed having a height in a range from 40 mm to 60 mm. The dimensions and size of the gel tray 345 can vary within or outside these ranges.

The gel tray 345 includes one or more capacitive orifices 350. The capacitive orifices 350 can be used as inputs or outputs for the power module 300. For example, the capacitive orifices 350 can be formed as a hole or an access point to couple a power supply (e.g., DC power supply) to the power module 300. The gel tray 345 can include a first capacitive orifice 350 that couples the first input terminal 205 of the laminated bus bar 100 with a positive bus bar to provide a positive power supply to the power module 300. The gel tray 345 can include a second capacitive orifice 350 that couples the second input terminal 210 of the laminated bus bar 100 with a negative bus bar to provide a first polarity (e.g., negative) power supply to the power module 300. The gel tray 345 can include a third capacitive orifice 350 that couples the output terminal 215 of the laminated bus bar 100 with a phase bus bar to provide an output voltage generated by the power module 300 to other components of an electric vehicle. For example, capacitive orifices 350 can be formed as a hole or an access point to provide a power (e.g., voltage) generated by the power module 300 to other systems, such as a drive train unit of an electric vehicle.

Figure 4:
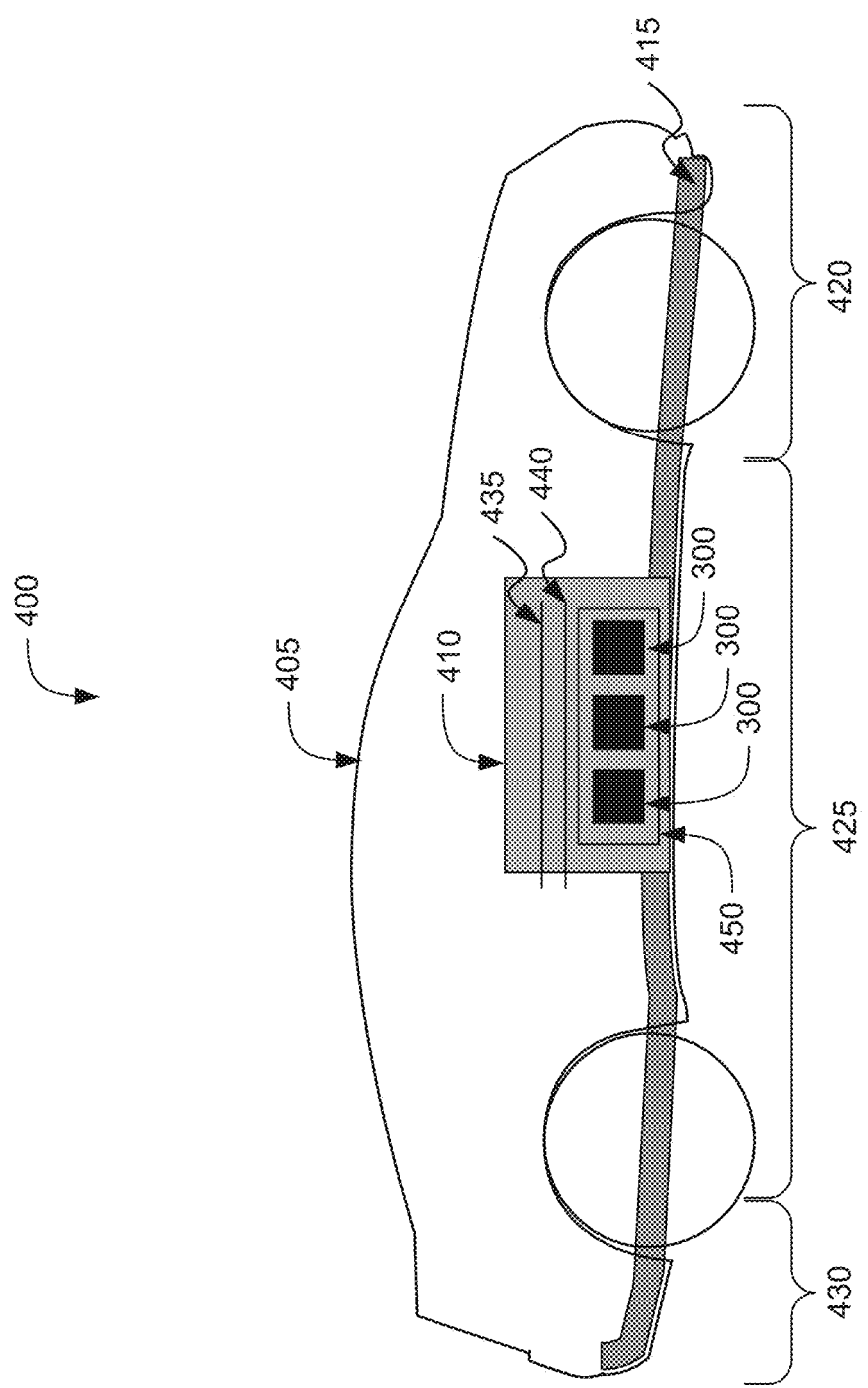
FIG. 4 is a block diagram depicting a cross-sectional view of an example electric vehicle installed with a battery pack.

FIG. 4 depicts an example cross-section view 400 of an electric vehicle 405 installed with a battery pack 410. The battery pack 410 can include an inverter module 450 having one or more single phase power modules 300. Each of the power modules 300 can include at least one laminated bus bar 100. For example, the inverter module 450 can include a three single phase power modules 300 with each power module 300 having a laminated bus bar 100 to form a three phase inverter module 450. The inverter module 450 can provide three phase power generated by power modules 300 to power the electric vehicle 405. The battery pack 410 can correspond to a drive train unit 410 of the electric vehicle 405. For example, the battery pack 410 can be disposed within or be a component of a drive train unit 410. The drive train unit 410 (and the battery pack 410) can provide power to the electric vehicle 405. For example, the drive train unit 410 may include components of the electric vehicle 405 that generate or provide power to drive the wheels or move the electric vehicle 405. The drive train unit 410 can be a component of an electric vehicle drive system. The electric vehicle drive system can transmit or provide power to different components of the electric vehicle 405. For example, the electric vehicle drive train system can transmit power from the battery pack 410 or drive train unit 410 to an axle or wheels of the electric vehicle 405.

The electric vehicle 405 can include an autonomous, semi-autonomous, or non-autonomous human operated vehicle. The electric vehicle 405 can include a hybrid vehicle that operates from on-board electric sources and from gasoline or other power sources. The electric vehicle 405 can include automobiles, cars, trucks, passenger vehicles, industrial vehicles, motorcycles, and other transport vehicles. The electric vehicle 405 can include a chassis 415 (e.g., a frame, internal frame, or support structure). The chassis 415 can support various components of the electric vehicle 405. The chassis 415 can span a front portion 420 (e.g., a hood or bonnet portion), a body portion 425, and a rear portion 430 (e.g., a trunk portion) of the electric vehicle 405. The front portion 420 can include the portion of the electric vehicle 405 from the front bumper to the front wheel well of the electric vehicle 405. The body portion 425 can include the portion of the electric vehicle 405 from the front wheel well to the back wheel well of the electric vehicle 405. The rear portion 430 can include the portion of the electric vehicle 405 from the back wheel well to the back bumper of the electric vehicle 405.

The battery pack 410 that includes the inverter module 450 having power modules 300 with at least one laminated bus bar 100 can be installed or placed within the electric vehicle 405. The battery pack 410 can include or couple with a power converter component. For example, the power converter component can include the inverter module 400 having three phase power module 405. The battery pack 410 can be installed on the chassis 415 of the electric vehicle 405 within the front portion 420, the body portion 425 (as depicted in FIG. 4), or the rear portion 430. The battery pack 410 can couple with a first bus-bar 435 and a second bus-bar 440 that are connected or otherwise electrically coupled with other electrical components of the electric vehicle 405 to provide electrical power from the battery pack 410.

Figure 5:
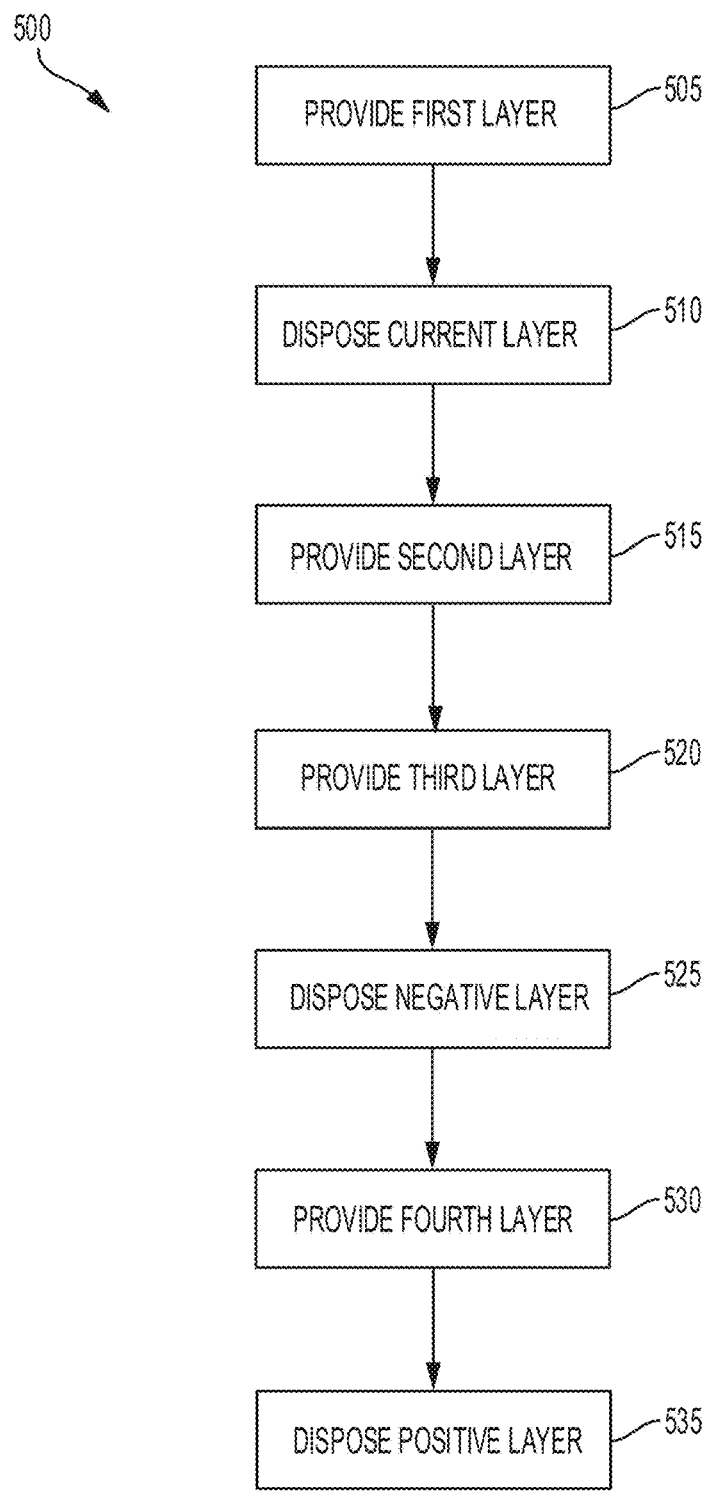
FIG. 5 depicts a flow diagram of an example method of forming a laminated bus bar of an inverter module of an electric vehicle, according to an illustrative implementation.

FIG. 5, among others, depicts a method 500 of providing a laminated bus bar 100 of an inverter module 450 having multiple power modules 300 to power an electric vehicle 405. For example, at least one laminated bus bar 100 can be disposed within each power module 300 that are coupled together to form the inverter module 450. The method 500 can include providing a first layer 105 (ACT 505). For example, the method 500 can include providing a first insulating layer 105 having a first surface 106 and a second surface 108. The first insulating layer 105 can be formed using non-conductive material or insulating material, such as but not limited to, Mylar material or plastic material. The first insulating layer 105 can form a bottom layer or bottom end of the laminated bus bar 100. Thus, the first insulating layer 105 can be the first layer of the laminated bus bar 100 provided during a manufacture process. For example, the laminated bus bar 100 can be assembled using a pick and place automation process. At least one locator hole 109 can be formed through the first insulating layer 105 for the manufacturing process to couple with a locator or locator device during a manufacturing process. For example, the first insulating layer 105 can include a first locator hole 109 at a first end of the first insulating layer 105 and a second locator hole 109 at a second end of the first insulating layer 105. The first end can be an opposing or opposite end as compared with the second end of the first insulating layer

105. The first insulating layer 105 can be the first layer of the laminated bus bar 100 picked and placed into position during the manufacture process. One or more orifices 107 can be formed through the first insulating layer 105. The orifices 107 can be formed having a round shape, octagonal shape, square shape, or rectangular shape. The orifices 107 can be formed to provide openings or holes to allow for leads from other components of an inverter module 450 (e.g., capacitor leads, transistor leads) to extend through or be exposed to couple with other layers of the laminated bus bar 100 (e.g., current layer 110, negative layer 140, positive layer 160) or couple with other components of the inverter module 450.

The method 500 can include disposing a current layer 110 (ACT 510). For example, the method 500 can include disposing a current layer 110 having a first surface 111 and a second surface 112 over the first surface 106 of the first insulting layer 105. The current layer 110 can include an output terminal 215. The current layer 110 can be disposed over the first insulating layer during a pick and place automation process. For example, at least one locator hole 109 can be formed through the current layer 110 for the manufacturing process to couple with a locator or locator device during a manufacturing process. For example, the current layer 110 can include a first locator hole 109 at a first end of the current layer 110 and a second locator hole 109 at a second end of the current layer 110. The first end can be an opposing or opposite end as compared with the second end of the current layer 110. The locator can couple with the current layer 110 using the locator holes 109 and place the current layer 110 over the first surface of the first insulating layer 105. The first insulating layer 105 can electrically insulate the current layer 110.

Disposing a current layer 110 can include forming a plurality of current leads 113 on the current layer 110. The current leads 113 can be formed using conductive material, such as but not limited to copper. The current leads 113 can be formed having an "S" shape, curved shape, curved stamped shape or bent shape. The current leads 113 can be formed having a curved stamped projection portion 114 (or projection portions). The curved stamped projection portions 114 can be formed having multiple portions having different shapes. For example, the curved stamped projection portions 114 can be formed having a first portion having a straight shape, a second portion having a curved shape, and a third portion having a straight shape. Disposing a current layer 110 can include forming a plurality of orifices 115 through the current layer 110. For example, openings or holes can be formed through the current layer 110 to allow for leads from other components of an inverter module (e.g., capacitor leads, transistor leads) to extend through or be exposed to couple with other layers of the laminated bus bar 100 (e.g., negative layer 140, positive layer 105) or to couple with other components of the inverter module. The orifices 115 can be formed having a round shape, octagonal shape, square shape, or a rectangular shape.

Disposing a current layer 110 can include forming an output terminal 215 at least one end or edge surface of the current layer 110. The output terminal 215 can be formed using conductive material. The output terminal 215 can be formed as an extension of the current layer 110. The output terminal 215 can be formed having a "U" shape with respect to a surface of the current layer 110. The output terminal 215 can correspond to an AC output for the laminated bus bar 100. One or more threaded insert orifices 255 (e.g., two threaded inserts 255) can be formed on the output terminal 215. The threaded insert orifices 255 can be formed having a threaded inner portion or threaded inner surface configured to receive or engage a threaded surface of a fastener, screw, bolt or other form of connection device or instrument.

The method 500 can include providing a second layer 120 (ACT 515). For example, the method 500 can include disposing a second insulating layer 120 having a first surface 122 and a second surface 124 over the first surface 111 of the current layer 110. The second insulating layer 120 can be formed using non-conductive material or insulating material, such as but not limited to, Mylar material or plastic material. At least one locator hole 127 can be formed through the second insulating layer 120 for the manufacturing process to couple with a locator or locator device during a manufacturing process. For example, the second insulating layer 120 can include a first locator hole 127 at a first end of the second insulating layer 120 and a second locator hole 127 at a second end of the second insulating layer 120. The first end can be an opposing or opposite end as compared with the second end of the second insulating layer 120. The second insulating layer 120 can couple with the locator during the manufacture process and be placed over the first surface of the current layer 110. One or more orifices 125 can be formed through the second insulating layer 120. The orifices 125 can be formed having a round shape, octagonal shape, square shape, or rectangular shape. The orifices 125 can be formed to provide openings or holes to allow for leads from other components of an inverter module 450 (e.g., capacitor leads, transistor leads) to extend through or be exposed to couple with other layers of the laminated bus bar 100 (e.g., negative layer 140, positive layer 160) or couple with other components of the inverter module 450.

The method 500 can include providing a third layer 130 (ACT 520). For example, the method 500 can include disposing a third insulating layer 130 having a first surface 132 and a second surface 134 over the first surface 122 of the second insulating layer 120. The third insulating layer 130 can be formed using non-conductive material or insulating material, such as but not limited to, Mylar material or plastic material. The third insulating layer 130 can be disposed over the second insulating layer 120 during a manufacture process. For example, at least one locator hole 137 can be formed through the third insulating layer 130 for the manufacturing process to couple with a locator or locator device during a manufacturing process. The third insulating layer 130 can couple with the locator during the manufacture process and be placed over the first surface 122 of the second insulating layer 120. For example, the third insulating layer 130 can include a first locator hole 137 at a first end of the third insulating layer 130 and a second locator hole 137 at a second end of the third insulating layer 130. The first end can be an opposing or opposite end as compared with the second end of the third insulating layer 130. Providing a third layer 130 can include forming one or more orifices 135 through the third insulating layer 130.

The orifices 135 can be formed having a round shape, octagonal shape, square shape, or rectangular shape. The orifices 135 can be formed to provide openings or holes to allow for leads from other components of an inverter module 450 (e.g., capacitor leads, transistor leads) to extend through or be exposed to couple with other layers of the laminated bus bar 100 (e.g., negative layer 140, positive layer 160 or couple with other components of the inverter module 450.

The method 500 can include disposing a negative layer 140 (ACT 525). For example, the method 500 can include disposing a negative layer 140 having a first surface 142 and a second surface 144 over the first surface 132 of the third insulating layer 130. The negative layer 140 can include a negative terminal 210. The negative layer 140 can be disposed over the third insulating layer 130 during a pick and place automation process. For example, at least one locator hole 147 can be formed through the negative layer 140 for the manufacturing process to couple with a locator or locator device during a manufacturing process. The negative layer 140 can include a first locator hole 147 at a first end of the negative layer 140 and a second locator hole 147 at a second end of the negative layer 140. The first end can be an opposing or opposite end as compared with the second end of the negative layer 140. The locator can couple with the negative layer 140 using the locator holes 147 and place the negative layer 140 over the first surface 132 of the third insulating layer 130.

Disposing a negative layer 140 can include forming a plurality of negative leads 148 on the negative layer 140. The negative leads 148 can be formed using conductive material, such as but not limited to copper. The negative leads 148 can be formed having an "S" shape, curved shape, curved stamped shape or bent shape. The negative leads 148 can be formed having a curved stamped projection portion 149 (or projection portions). The curved stamped projection portions 149 can be formed having multiple portions having different shapes. For example, the curved stamped projection portions 149 can be formed having a first portion having a straight shape, a second portion having a curved shape, and a third portion having a straight shape. Disposing a negative layer 140 can include forming a plurality of orifices 145 through the negative layer 140. For example, openings or holes can be formed through the negative layer 140 to allow for leads from other components of an inverter module (e.g., capacitor leads, transistor leads) to extend through or be exposed to couple with other layers of the laminated bus bar 100 (e.g., positive layer 160) or to couple with other components of the inverter module. The orifices 145 can be formed having a round shape, octagonal shape, square shape, or a rectangular shape.

Disposing a negative layer 140 can include forming a negative terminal 210 at least one end or edge surface of the negative layer 140. The negative terminal 210 can be formed using conductive material. The negative terminal 210 can be formed as an extension of the negative layer 140. The negative terminal 210 can be formed having a "U" shape with respect to a surface of the negative layer 140. The negative terminal 210 can correspond to a DC input (e.g., negative DC input terminal) for the laminated bus bar 100. At least one threaded insert 235 can be formed on the negative terminal 210. The threaded insert orifice 235 can be formed having a threaded inner portion or threaded inner surface configured to receive or engage a threaded surface of a fastener, screw, bolt or other form of connection device or instrument.

The method 500 can include providing a fourth layer 150 (ACT 530). For example, the method 500 can include disposing a fourth insulating layer 150 having a first surface 152 and a second surface 154 over the first surface 142 of the negative layer 140. The fourth insulating layer 150 can be formed using non-conductive material or insulating material, such as but not limited to, Mylar material or plastic material. At least one locator hole 157 can be formed through the fourth insulating layer 150 for the manufacturing process to couple with a locator or locator device during a manufacturing process. For example, the fourth insulating layer 150 can include a first locator hole 157 at a first end of the fourth insulating layer 150 and a second locator hole 157 at a second end of the fourth insulating layer 150. The first end can be an opposing or opposite end as compared with the second end of the fourth insulating layer 150. The fourth insulating layer 150 can couple with the locator during the manufacture process and be placed over the first surface of the negative layer 140. One or more orifices 155 can be formed through the fourth insulating layer 150. The orifices 155 can be formed having a round shape, octagonal shape, square shape, or rectangular shape. The orifices 155 can be formed to provide openings or holes to allow for leads from other components of an inverter module 450 (e.g., capacitor leads, transistor leads) to extend through or be exposed to couple with other layers of the laminated bus bar 100 (e.g., positive layer 160) or couple with other components of the inverter module 450.

The method 500 can include disposing a positive layer 160 (ACT 535). For example, the method 500 can include disposing a positive layer 160 having a first surface 162 and a second surface 164 over the first surface 152 of the fourth insulating layer 150. The positive layer 160 can include a positive terminal 205. The positive layer 160 can be disposed over the fourth insulating layer 150 during a pick and place automation process. For example, at least one locator hole 167 can be formed through the positive layer 160 for the manufacturing process to couple with a locator or locator device during a manufacturing process. The positive layer 160 can include a first locator hole 167 at a first end of the positive layer 160 and a second locator hole 167 at a second end of the positive layer 160. The first end can be an opposing or opposite end as compared with the second end of the positive layer 160. The locator can couple with the positive layer 160 using the locator holes 167 and place the positive layer 160 over the first surface 152 of the fourth insulating layer 150.

Disposing a positive layer 160 can include forming a plurality of positive leads 168 on the positive layer 160. The positive leads 168 can be formed using conductive material, such as but not limited to copper. The positive leads 168 can be formed having an "S" shape, curved shape, curved stamped shape or bent shape. The positive leads 168 can be formed having a curved stamped projection portion 169 (or projection portions). The curved stamped projection portions 169 can be formed having multiple portions having different shapes. For example, the curved stamped projection portions 169 can be formed having a first portion having a straight shape, a second portion having a curved shape, and a third portion having a straight shape. Disposing a positive layer 160 can include forming a plurality of orifices 165 through the positive layer 160. For example, openings or holes can be formed through the positive layer 160 to allow for leads from other components of an inverter module (e.g., capacitor leads, transistor leads) to extend through or be exposed to couple with other components of the inverter module. The orifices 165 can be formed having a round shape, octagonal shape, square shape, or a rectangular shape.

Disposing a positive layer 160 can include forming a positive terminal 205 at least one end or edge surface of the positive layer 160. The positive terminal 205 can be formed using conductive material. The positive terminal 205 can be formed as an extension of the positive layer 160. The positive terminal 205 can be formed having a "U" shape with respect to a surface of the positive layer 160. The positive terminal 205 can correspond to a DC input (e.g., positive DC input terminal) for the laminated bus bar 100. At least one threaded insert orifice 225 can be formed on the positive terminal 205. The threaded insert orifice 225 can be formed having a threaded inner portion or threaded inner surface configured to receive or engage a threaded surface of a fastener, screw, bolt or other form of connection device or instrument.

Providing the laminated bus bar 100 can include forming a curved stamped projection portion 207 on the positive terminal 205 and forming an insert orifice 225 on the positive terminal 205. Providing the laminated bus bar 100 can include forming a curved stamped projection portion 212 on the negative terminal 210 and forming an insert orifice 235 on the negative terminal 210. Providing the laminated bus bar 100 can include forming a curved stamped projection portion 217 on the output terminal 215 and forming two threaded insert orifices 255 on the output terminal 215. Providing the laminated bus bar 100 can include disposing a laminated bus bar 100 in an inverter module 450 of a drive train unit of an electric vehicle 405. For example, at least one laminated bus bar 100 can be disposed within a power module 300. One or more power modules 300 can be disposed within an inverter module 450 of a drive train unit. For example, three power modules 300, each having at least one laminated bus bar 100, can be coupled together in a triplet configuration and disposed within an inverter module 450 to form a three phase inverter module 450. The inverter module 450 can be disposed within a drive train unit or a battery pack 410 of an electric vehicle 405. The drive train unit or the battery pack 410 can include a single inverter module 450 or multiple inverter modules 300. Providing the laminated bus bar 100 can include providing the laminated bus bar 100 in an inverter module 450 of a drive train unit or battery pack 410. The drive train unit, having the inverter module 450, or the battery pack 410, having the inverter module 450, can be provided in the electric vehicle 405.

Figure 6:
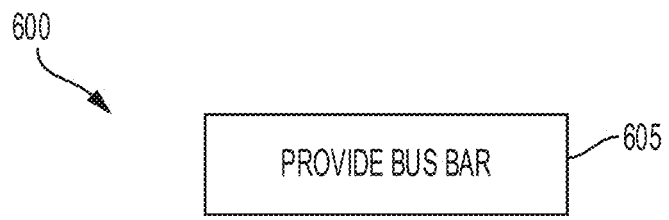
FIG. 6 depicts a flow diagram of an example method of providing a laminated bus bar of an inverter module of an electric vehicle, according to an illustrative implementation.

FIG. 6, among others, depicts a method 600 for providing a laminated bus bar 100 of an inverter module 450 to power an electric vehicle 405. The method 600 can include providing a bus bar 100 (ACT 605). For example, method 600 can include providing a laminated bus bar 100 of an inverter module 450 of an electric vehicle 405. The laminated bus bar 100 can include a first insulating layer 105 having a first surface 106 and a second surface 108. The laminated bus bar 100 can include a current layer 110 having a first surface 111 and a second surface 112. The current layer 110 can be disposed over the first surface 106 of the first insulating layer 105. The current layer 110 can include an output terminal 215. The laminated bus bar 100 can include a second insulating layer 120 having a first surface 122 and a second surface 124. The second insulating layer 120 can be disposed over the first surface 111 of the current layer 110. The laminated bus bar 100 can include a third insulating layer 130 having a first surface 132 and a second surface 134. The third insulating layer 130 can be disposed over the first surface 122 of the second insulating layer 120. The laminated bus bar 100 can include a negative layer 140 having a first surface 142 and a second surface 144. The negative layer 140 can be disposed over the first surface 132 of the third insulating layer 130. The negative layer 140 can include a negative input terminal 210. The laminated bus bar 100 can include a fourth insulating layer 150 having a first surface 152 and a second surface 154. The fourth insulating layer 150 can be disposed over the first surface 142 of the negative layer 140. The laminated bus bar 100 can include a positive layer 160 having a first surface 162 and a second surface 164. The positive layer 160 can be disposed over the first surface 152 of the fourth insulating layer 150. The positive layer 160 can include a positive input terminal 205.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells can be 5V or less than or greater than 5V. Further, the bus bar need not be laminated. References to one element disposed over another element can include the two elements being coupled with, in contact with, or fastened to one another, or in direct or indirect contact with one another in any spatial or positional orientation. For example intervening elements such as laminate, spacers, or other materials may be uniformly or partially present between elements that are disposed over one another. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative polarity elements can instead be configured as positive polarity elements and elements described as positive polarity elements can instead by configured as negative polarity elements. A "first polarity" can be positive or negative polarity. A "second polarity" can be positive or negative polarity. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A laminated bus bar of an inverter module to power an electric vehicle, comprising:
    a first insulating layer having a first surface and a second surface;
    a current layer having a first surface and a second surface, the current layer disposed over the first surface of the first insulting layer, and the current layer including an output terminal and an extension portion, the output terminal spaced a distance from an edge surface of the current layer that is equal to a length of the extension portion;
    a second insulating layer having a first surface and a second surface, the second insulating layer disposed over the first surface of the current layer;
    a third insulating layer having a first surface and a second surface, the third insulating layer disposed over the first surface of the second insulating layer;
    a first polarity layer having a first surface and a second surface, the first polarity layer disposed over the first surface of the third insulating layer, and the first polarity layer including a first polarity input terminal;
    a fourth insulating layer having a first surface and a second surface, the fourth insulating layer disposed over the first surface of the first polarity layer; and
    a second polarity layer having a first surface and a second surface, the second polarity layer disposed over the first surface of the fourth insulating layer, and the second polarity layer including a second polarity input terminal and an extension portion, the second polarity input terminal spaced a distance from an edge surface of the second polarity layer that is equal to a length of the extension portion, and the second polarity input terminal spaced the distance from an edge surface of the first polarity layer that is equal to the length of the extension portion.

2. The laminated bus bar of claim 1, wherein the second polarity input terminal is a positive input terminal, comprising:
    the positive input terminal having a curved stamped projection shape and an insert orifice.

3. The laminated bus bar of claim 1, wherein the first polarity input terminal is a negative input terminal, comprising:
    the negative input terminal having a curved stamped projection shape and an insert orifice.

4. The laminated bus bar of claim 1, comprising:
    the output terminal having a curved stamped projection shape and two threaded insert orifices.

5. The laminated bus bar of claim 1, comprising:
    the first polarity input terminal and the second polarity input terminal formed on a first side of the laminated bus bar; and
    the output terminal formed on a second side of the laminated bus bar, the first side different from the second side.

6. The laminated bus bar of claim 1, wherein the first polarity layer is a negative layer and the second polarity layer is a positive layer, comprising:
    the positive layer including a plurality of positive leads extending from the first surface of the positive layer at a first angle;

the negative layer including a plurality of negative leads extending from the first surface of the negative layer at a first angle; and the current layer including a plurality of current leads extending from the first surface of the current layer at a first angle.

7. The laminated bus bar of claim 1, comprising:
at least two locator holes formed in each of the first polarity layer, the second polarity layer, the current layer, the first insulating layer, the second insulating layer, the third insulating layer, and the fourth insulating layer.

8. The laminated bus bar of claim 1, comprising:
the first insulating layer having an insulation extension, a first surface of the insulation extension of the first insulating layer in contact with a first surface of the extension portion of the current layer;
the second insulating layer having an insulation extension, a first surface of the insulation extension of the second insulating layer in contact with a second surface of the extension portion of the current layer.

9. The laminated bus bar of claim 1, comprising:
the third insulating layer having an insulation tab; and
the fourth insulating layer having an insulation tab.

10. The laminated bus bar of claim 1, wherein the first polarity input terminal is a negative input terminal and the second polarity input terminal is a positive input terminal, comprising:
the positive input terminal disposed at a first level with respect to the first insulating layer; and
the negative input terminal disposed at a second level with respect to the first insulating layer, the first level different than the second level.

11. The laminated bus bar of claim 1, comprising:
each of the first, second, third and fourth insulating layers having a plurality of apertures, the plurality of apertures aligned with respect to each other.

12. The laminated bus bar of claim 1, comprising:
the laminated bus bar disposed in an inverter module of a drive train unit, the drive train unit having multiple inverter modules.

13. The laminated bus bar of claim 1, comprising:
the laminated bus bar disposed in an inverter module of a drive train unit, the drive train unit disposed in an electric vehicle.

14. A method of providing a laminated bus bar of an inverter module to power an electric vehicle, the method comprising:
providing a first insulating layer having a first surface and a second surface;
disposing a current layer having a first surface and a second surface over the first surface of the first insulting layer, the current layer including an output terminal and an extension portion, the output terminal spaced a distance from an edge surface of the current layer that is substantially equal to a length of the extension portion;
disposing a second insulating layer having a first surface and a second surface over the first surface of the current layer;
disposing a third insulating layer having a first surface and a second surface over the first surface of the second insulating layer;
disposing a first polarity layer having a first surface and a second surface over the first surface of the third insulating layer, the first polarity layer including a first polarity terminal;
disposing a fourth insulating layer having a first surface and a second surface over the first surface of the first polarity layer; and
disposing a second polarity layer having a first surface and a second surface over the first surface of the fourth insulating layer, the second polarity layer including a second polarity terminal and an extension portion, the second polarity input terminal spaced a distance from an edge surface of the second polarity layer that is substantially equal to a length of the extension portion, and the second polarity input terminal spaced the distance from an edge surface of the first polarity layer that is substantially equal to the length of the extension portion.

15. The method of claim 14, wherein the first polarity terminal is a negative terminal and the second polarity terminal is a positive terminal, comprising:
forming a curved stamped projection portion on the positive terminal;
forming an insert orifice on the positive terminal;
forming a curved stamped projection portion on the negative terminal;
forming an insert orifice on the negative terminal;
forming a curved stamped projection portion on the output terminal; and
forming two threaded insert orifices on the output terminal.

16. The method of claim 14, wherein the first polarity layer is a negative layer and the second polarity layer is a positive layer, comprising:
forming a plurality of positive leads on the first surface of the positive layer, the plurality of positive leads extending from the first surface of the positive layer at a first angle;
forming a plurality of negative leads on the first surface of the negative layer, the plurality of negative leads extending from the first surface of the negative layer at a first angle; and
forming a plurality of current leads on the first surface of the current layer, the plurality of current leads extending from the first surface of the current layer at a first angle.

17. The method of claim 14, comprising:
forming at least two locator holes in each of the first polarity layer, the second polarity layer, the current layer, the first insulating layer, the second insulating layer, the third insulating layer, and the fourth insulating layer.

18. The method of claim 14, comprising:
disposing the laminated bus bar in an inverter module of a drive train unit, the drive train unit having multiple inverter modules.

19. The method of claim 14, comprising:
providing the laminated bus bar in an inverter module of a drive train unit; and
providing the drive train unit in an electric vehicle.

20. An electric vehicle, comprising:
a laminated bus bar of an inverter module of an electric vehicle, the laminated bus bar comprising:
a first insulating layer having a first surface and a second surface;
a current layer having a first surface and a second surface, the current layer disposed over the first surface of the first insulting layer, and the current layer including an output terminal and an extension portion, the output terminal spaced a distance from an edge surface of the current layer that is equal to a length of the extension portion;

a second insulating layer having a first surface and a second surface, the second insulating layer disposed over the first surface of the current layer;

a third insulating layer having a first surface and a second surface, the third insulating layer disposed over the first surface of the second insulating layer;

a first polarity layer having a first surface and a second surface, the first polarity layer disposed over the first surface of the third insulating layer, and the first polarity layer including a first polarity input terminal;

a fourth insulating layer having a first surface and a second surface, the fourth insulating layer disposed over the first surface of the first polarity layer; and a second polarity layer having a first surface and a second surface, the second polarity layer disposed over the first surface of the fourth insulating layer, and the second polarity layer including a second polarity input terminal and an extension portion, the second polarity input terminal spaced a distance from an edge surface of the second polarity layer that is equal to a length of the extension portion, and the second polarity input terminal spaced the distance from an edge surface of the first polarity layer that is equal to the length of the extension portion.

* * * * *